United States Patent
Balachandran et al.

(10) Patent No.: US 10,341,994 B2
(45) Date of Patent: Jul. 2, 2019

(54) AUTONOMOUS WIRELESS TRANSMISSIONS

(71) Applicants: Krishna Balachandran, Morganville, NJ (US); Joseph H. Kang, Belle Mead, NJ (US); Kemal M. Karakayali, Hoboken, NJ (US); Kiran M. Rege, Marlboro, NJ (US)

(72) Inventors: Krishna Balachandran, Morganville, NJ (US); Joseph H. Kang, Belle Mead, NJ (US); Kemal M. Karakayali, Hoboken, NJ (US); Kiran M. Rege, Marlboro, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 121 days.

(21) Appl. No.: 15/081,171

(22) Filed: Mar. 25, 2016

(65) Prior Publication Data
US 2017/0280438 A1 Sep. 28, 2017

(51) Int. Cl.
*H04W 72/04* (2009.01)
*H04W 76/10* (2018.01)
(Continued)

(52) U.S. Cl.
CPC ......... *H04W 72/0413* (2013.01); *H04W 4/06* (2013.01); *H04W 72/048* (2013.01);
(Continued)

(58) Field of Classification Search
None
See application file for complete search history.

(56) References Cited

U.S. PATENT DOCUMENTS

| 9,693,336 B2* | 6/2017 | Pinheiro | H04W 36/14 |
| 2009/0040969 A1* | 2/2009 | Kim | H04W 28/06 |
| | | | 370/328 |

(Continued)

FOREIGN PATENT DOCUMENTS

| WO | WO 2015/035650 A1 | 3/2015 |
| WO | WO 2015/051486 A1 | 4/2015 |

(Continued)

OTHER PUBLICATIONS

K. Balachandran, J. Kang, K. Karakayali, K. Rege, "Delay-Tolerant Autonomous Transmissions for Short Packet Communications," IEEE Globecom Workshop on IoT-Link, Dec. 2016, 6 pages.
(Continued)

*Primary Examiner* — Jamaal Henson
(74) *Attorney, Agent, or Firm* — Tong, Rea, Bentley & Kim, LLC

(57) ABSTRACT

The present disclosure generally discloses an autonomous wireless transmission mechanism. The autonomous wireless transmission mechanism may be configured to support autonomous transmissions by wireless end devices to wireless access nodes in a connectionless manner. In general, an autonomous wireless transmission by a wireless end device may include transmission of a preamble in a preamble transmission zone and autonomous transmission of a payload over one or more resource units of one or more payload transmission zones without requiring establishment of a connection between the wireless end device and the wireless access node. The autonomous wireless transmission mechanism, by obviating the need for a wireless end device to establish a connection with a wireless access node in order to transmit data to the wireless access node, also obviates a need for the wireless end device to operate in a scheduled transmission mode.

29 Claims, 8 Drawing Sheets

(51) Int. Cl.
*H04W 4/06* (2009.01)
*H04W 74/00* (2009.01)

(52) U.S. Cl.
CPC .......... *H04W 76/10* (2018.02); *H04W 74/004* (2013.01); *H04W 74/006* (2013.01)

(56) References Cited

U.S. PATENT DOCUMENTS

| | | | | |
|---|---|---|---|---|
| 2012/0184206 | A1* | 7/2012 | Kim | H04L 5/0091 455/9 |
| 2012/0208545 | A1* | 8/2012 | Yang | H04W 74/002 455/450 |
| 2012/0281566 | A1* | 11/2012 | Pelletier | H04W 76/046 370/252 |
| 2012/0320842 | A1* | 12/2012 | Jeong | H04W 74/006 370/329 |
| 2013/0201932 | A1* | 8/2013 | Ko | H04L 1/0061 370/329 |
| 2013/0301611 | A1* | 11/2013 | Baghel | H04W 72/04 370/331 |
| 2014/0112286 | A1* | 4/2014 | Ahn | H04W 74/002 370/329 |
| 2014/0376489 | A1* | 12/2014 | Lee | H04L 5/0055 370/329 |
| 2016/0198497 | A1 | 7/2016 | Yu et al. | |

FOREIGN PATENT DOCUMENTS

| | | | | |
|---|---|---|---|---|
| WO | WO 2015051486 A1 * | 4/2015 | ............ | H04W 72/00 |
| WO | WO-2015051486 A1 * | 4/2015 | ............ | H04W 72/00 |

OTHER PUBLICATIONS

International Search Report and Written Opinion for corresponding PCT Application No. PCT/US2017/021996, dated Jun. 16, 2017, 11 pages.

* cited by examiner

AUTONOMOUS WIRELESS TRANSMISSIONS

TECHNICAL FIELD

The disclosure relates generally to the field of communication systems and, more particularly but not exclusively, to wireless communication systems.

BACKGROUND

Over the past two decades, wide-area cellular networks have evolved substantially from primarily circuit mode voice to scheduled broadband packet data access over the 3GPP Long Term Evolution (LTE) air interface. This evolution has primarily focused on improving data throughput and latency for broadband applications, but suffers from several shortcomings (e.g. high scheduling overhead, limited coverage, low battery life, and so forth) for the type of short packet access that is envisioned for various types of wireless Machine Type Communications (MTCs), such as the Internet of Things (IoT), and various other types wireless communications.

SUMMARY

The present disclosure generally discloses an autonomous wireless transmission mechanism for supporting connectionless wireless access by a wireless end device for communication via a wireless access node.

In at least some embodiments, a wireless device is configured to communicate via a wireless uplink channel. The wireless device includes a processor and a memory communicatively connected to the processor. The processor is configured to transmit a preamble toward a wireless access node in a preamble transmission zone of the wireless uplink channel. The processor is configured to transmit a payload toward the wireless access node over a first resource chunk in a first payload transmission zone of the wireless uplink channel without establishing a connection with the wireless access node. The processor is configured to, based on a condition detected by the wireless device, retransmit the payload or a redundancy version of the payload over a second resource chunk in a second payload transmission zone of the wireless uplink channel without retransmitting the preamble.

In at least some embodiments, a method for use by a wireless device to communicate via a wireless uplink channel is provided. The method includes transmitting a preamble toward a wireless access node in a preamble transmission zone of the wireless uplink channel. The method includes transmitting a payload toward the wireless access node over a first resource chunk in a first payload transmission zone of the wireless uplink channel without establishing a connection with the wireless access node. The method includes, based on a condition detected by the wireless device, retransmitting the payload or a redundancy version of the payload over a second resource chunk in a second payload transmission zone of the wireless uplink channel without retransmitting the preamble.

In at least some embodiments, a wireless access node is configured to support communication by a wireless device via a wireless uplink channel. The wireless access node includes a processor and a memory communicatively connected to the processor. The processor is configured to detect a preamble in a preamble transmission zone of the wireless uplink channel. The processor is configured to receive a first signal over a first resource chunk of a first payload transmission zone of the wireless uplink channel without establishing a connection with the wireless device. The processor is configured to, based on a condition detected by the wireless access node, receive a second signal over a second resource chunk of a second payload transmission zone of the wireless uplink channel without detecting a retransmission of the preamble.

In at least some embodiments, a method for use by a wireless access node, which is configured to support communication by a wireless device via a wireless uplink channel, is provided. The method includes detecting a preamble in a preamble transmission zone of the wireless uplink channel. The method includes receiving a first signal over a first resource chunk of a first payload transmission zone of the wireless uplink channel without establishing a connection with the wireless device. The method includes, based on a condition detected by the wireless access node, receive a second signal over a second resource chunk of a second payload transmission zone of the wireless uplink channel without detecting a retransmission of the preamble.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure generally discloses an autonomous wireless transmission mechanism for use in wireless communication systems. The autonomous wireless transmission mechanism may be configured to support autonomous transmissions by wireless end devices to wireless access nodes in a connectionless manner. The autonomous wireless transmission mechanism may be configured to support an autonomous transmission of a payload from a wireless end device to a wireless access node by transmitting a preamble toward the wireless access node and, without establishing a connection with the wireless access node, transmitting the payload to the wireless access node using one or more payload transmissions (which may include one or more retransmissions of the payload without retransmitting the preamble). The autonomous wireless transmission mechanism, by obviating the need for a wireless end device to establish a connection with a wireless access node in order to transmit data to the wireless access node, also obviates a need for the wireless end device to operate in a scheduled transmission mode (e.g., such as the scheduled transmission mode in Third Generation (3G) wireless systems, Fourth Generation (4G) Long Term Evolution (LTE) wireless systems, or the like) in order to transmit payload data to the wireless access node. The autonomous wireless transmission mechanism, by obviating the need for a wireless end device to establish a connection with a wireless access node in order to transmit data to the wireless access node (and, again, obviating a need for the wireless end device to operate in a scheduled transmission mode), conserves resources on the wireless uplink (e.g., resources that would be used to establish the connection and request uplink transmission scheduling grants for transmission via the uplink) and conserves resources on the wireless downlink (e.g., resources that would be used to establish the connection and provide uplink transmission scheduling grants for transmission via the uplink). The autonomous wireless transmission mechanism, by obviating the need for a wireless end device to establish a connection with a wireless access node in order to transmit data to the wireless access node (again, obviating a need for the wireless end device to operate in a scheduled transmission mode), enables the wireless end device to remain in a sleep mode for longer periods of time (since it no longer has to remain in an active mode in order to wait for receipt of uplink transmission scheduling grants when it wants to transmit) and, thus, conserves power of the wireless end device (which makes various embodiments particularly well-suited for power-limited devices, such as Internet-of-Things (IoT) devices and other types of Machine-Type-Communication (MTC) devices). These and various other embodiments and potential advantages of the autonomous wireless transmission mechanism may be further understood by way of reference to FIG. 1.

Figure 1:
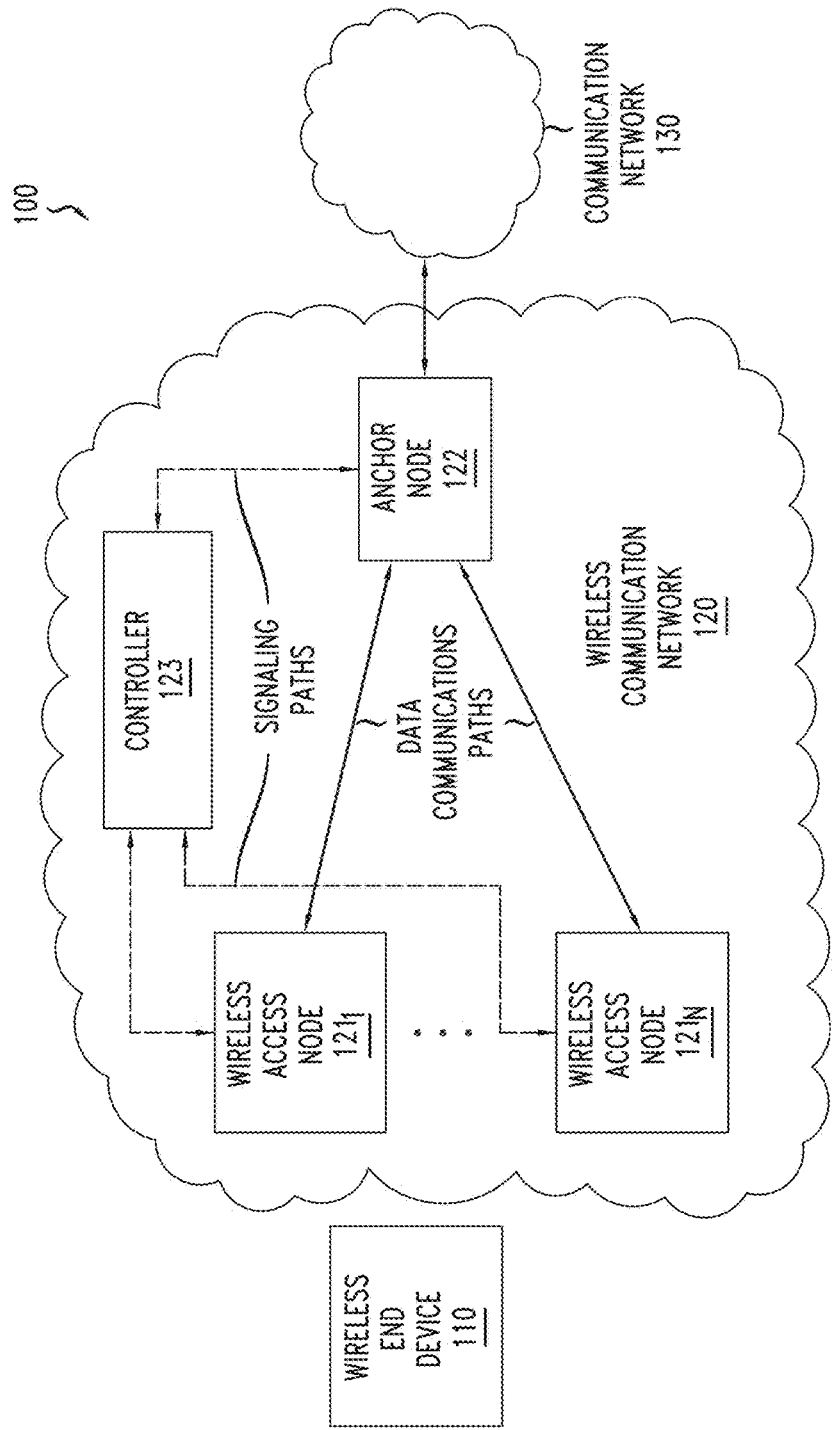
FIG. 1 depicts an exemplary wireless communication system configured to support autonomous wireless transmission by a wireless end device to a wireless access node.

FIG. 1 depicts an exemplary wireless communication system configured to support autonomous wireless transmission by a wireless end device to a wireless access node.

The wireless communication system 100 is a wireless communication system configured to support autonomous wireless transmissions by wireless end devices. The wireless communication system 100 may be based on any suitable wireless system technology. For example, various embodiments of the autonomous wireless transmission mechanism may be applied to various cellular-based wireless systems. For example, various embodiments of the autonomous wireless transmission mechanism may be applied to Third Generation (3G) wireless communication systems (e.g., Universal Mobile for Telecommunication Systems (UMTS) or other 3G wireless systems), Fourth Generation (4G) wireless communication systems (e.g., Long Term Evolution (LTE) or other 4G wireless technologies), Fifth Generation (5G) wireless communication systems, or the like. For example, embodiments of the autonomous wireless transmission mechanism may be applied to various other types of wireless communication systems.

The wireless communication system 100 includes a wireless end device 110, a wireless communication network 120, and a communication network 130.

The wireless end device 110 is a wireless device that is configured to wirelessly access wireless communication network 120 and communicate via wireless communication network 120. The wireless end device 110 may be an end user device (e.g., a smartphone, a tablet computer, a laptop computer, or the like), an autonomous device (e.g., an Internet-of-Things device (e.g., a sensor, a monitor, or the like), a device configured for machine-to-machine (M2M) communications, or the like), or the like. The wireless end device 110 may have a wireless end device identifier configured thereon at some time prior to performing autonomous wireless transmissions (e.g., for use in place of the C-RNTI (or other identifier) which otherwise might have been assigned to the wireless end device if a connection was established between the wireless end device and a wireless access node of wireless communication network 120). The wireless end device 110 is configured to support various functions in support of various embodiments of the autonomous wireless transmission mechanism, as discussed further at least with respect to FIG. 4.

The wireless communication network 120 is configured to support communications between wireless end device 110 (as well as various other wireless end devices which have been omitted for purposes of clarity) and communication network 130. The wireless communication network 120 includes a set of wireless access nodes $121_1$-$121_N$ (collectively, wireless access nodes 121), an anchor node 122, and a controller 123. As depicted in FIG. 1, wireless access nodes 121 and anchor node 122 are configured to communicate via data communication paths which, although omitted for purposes of clarity, may include various network elements (e.g., switches, routers, or the like), communication links, or the like, as well as various combinations thereof. As further depicted in FIG. 1, controller 123 is configured to communicate with wireless access nodes 121 and anchor node 122 via signaling paths which, although omitted for purposes of clarity, may include various network elements (e.g., switches, routers, or the like), communication links, or the like, as well as various combinations thereof.

The wireless access nodes 121 are configured to operate as wireless points of access to the wireless communication network 120 for wireless end device 110 (as well as various other wireless end devices which, as noted above, have been omitted for purposes of clarity). The wireless access nodes 121 may be configured to support network attach procedures by which wireless end device 110 (as well as various other wireless end devices which, as noted above, have been omitted for purposes of clarity) may attach to the wireless communication network 120. The wireless access nodes 121 may be configured to support autonomous transmissions by wireless end device 110 (as well as various other wireless end devices which, as noted above, have been omitted for purposes of clarity). The wireless access nodes 121 are configured to support wireless communications of wireless end device 110, including wireless uplink transmission from wireless end device 110 and wireless downlink transmissions to wireless end device 110. The wireless access nodes 121 are configured to support backhaul communications between wireless access nodes 121 and communication network 130. The wireless access nodes 121 may be configured to provide various other functions. For example, wireless access nodes 121 may include 3G UMTS NodeBs, LTE Evolved NodeBs (eNodeBs), 5G base transceiver stations (BTSs), small cell radio access points (e.g., femtocells, picocells, microcells, and so forth), or the like. The typical functions supported by the wireless access nodes of a wireless communication network (such as wireless access nodes 121 of wireless communication network 120) will be understood by one skilled in the art. The wireless access nodes 121 are configured to support various functions in support of various embodiments of the autonomous wireless transmission mechanism, as discussed further at least with respect to FIG. 5.

The anchor node 122 is configured to operate as a mobility anchor and a network-layer anchor point (e.g., an IP anchor point) for wireless end device 110 (as well as various other wireless end devices which, as noted above, have been omitted for purposes of clarity). The anchor node 122 may be configured to operate as gateway between wireless communication network 120 and communication network 130, supporting communication of packets between wireless communication network 120 and communication network 130. For upstream communications from wireless end device 110 toward communication network 130, the anchor node 122 is configured to direct received packets toward the communication network 130. For downstream communications intended for delivery to the wireless end device 110, the anchor node 122 is configured to receive packets from the communication network 130, identify the wireless access node 121 via which the wireless end device 110 is currently attached, and forward the packets toward the wireless access node 121 via which the wireless end device 110 is currently attached for delivery to the wireless end device 110. For example, anchor node 122 may be a 3G UMTS Gateway General Packet Radio Service (GPRS) Support Node (GGSN), an LTE Packet Data Network (PDN) Gateway (PGW), a 5G switch configured to provide an anchor function, or the like. The typical functions supported by the anchor node of a wireless communication network (such as anchor node 122 of wireless communication network 120) will be understood by one skilled in the art. The anchor node 122 may be configured to provide various other functions.

The controller 123 is configured to provide various control functions for wireless communication network 120. The controller 123 is configured to communicate with wireless access nodes 121 and anchor node 122 for purposes of supporting control functions. The controller 123 is configured to support network attach procedures by which wireless end device 110 (as well as various other wireless end devices which, as noted above, have been omitted for purposes of clarity) attaches to the wireless communication network 120, which may include authentication of wireless end device 110, authorization of service for the wireless end device 110, or the like, as well as various combinations thereof. The controller 123 is configured to support various functions in support of various embodiments of the autonomous wireless transmission mechanism.

The wireless communication network 120 may be considered to include a wireless access network portion (e.g., including wireless access nodes 121) and a wireless core network portion (e.g., including anchor node 122 and controller 123). The wireless communication network 120 may be implemented in various ways. For example, where wireless communication network 120 is a 3G UMTS-based network, wireless communication network 120 may be implemented using a physical wireless access network portion including wireless access nodes 121 and a physical core network portion including anchor node 122 and controller 123. For example, where the wireless communication network 120 is an LTE-based network, wireless communication network 120 may be implemented using a physical wireless access network portion including wireless access nodes 121 and a physical Evolved Packet Core (EPC) network including the anchor node 122 and controller 123. For example, where the wireless communication network 120 is an LTE-based network, wireless communication network 120 may be implemented using a physical wireless access network portion including wireless access nodes 121 and a virtualized EPC network in which the functions of anchor node 122 and controller 123 are virtualized in a cloud environment. The wireless communication network 120 may be implemented in various other ways (e.g., based on 5G or other types of wireless networks).

The wireless communication network 120 may be based on various wireless technologies and, thus, the elements of wireless communication network 120 may be implemented in various ways. As indicated above for example, where the wireless communication network 120 is a 3G UMTS-based network, wireless access nodes 121 may be NodeBs, anchor node 122 may be a Gateway General Packet Radio Service (GPRS) Support Node (GGSN), and controller 123 may be a Mobility Management Entity (MME). As indicated above for example, where the wireless communication network 120 is an LTE-based network, wireless access nodes 121 may be eNodeBs, anchor node 122 may be a Packet Data Network (PDN) Gateway (PGW), and controller 123 may be a Mobility Management Entity (MME). The wireless communication network 120 may be considered to be arranged in other configurations. As indicated above, for example, where the wireless communication network 120 is a 5G network, wireless access nodes 121 may be 5G base transceiver station (BTS), anchor node 122 may be a switch configured to provide an anchor function, and controller 123 may be a 5G network controller. The elements of wireless communication network 120 may be implemented in various other ways.

The wireless communication network 120 may be implemented using various communication and control capabilities or technologies. For example, communication and control capabilities of wireless communication network 120 may be implemented using underlying signaling and control capabilities based on the type of wireless technology of wireless communication network (e.g., underlying signaling and control capabilities of a 3G UMTS-based wireless system, underlying signaling and control capabilities of an LTE-based wireless system, underlying signaling and control capabilities of a 5G wireless system, or the like). For example, communication and control capabilities of wireless communication network 120 may be implemented using a Software Defined Networking (SDN) capability in which controller 123 is configured to operate as an SDN controller and other elements of wireless communication network 120 (namely, wireless access nodes 121, anchor node 122, and, optionally, other elements of wireless communication network 120 which have been omitted for purposes of clarity) are configured to operate as SDN network devices. The communication and control capabilities of wireless communication network 120 may be implemented in various other ways.

The communication network 130 may include any communication network via which wireless end device 110 (as well as various other wireless end devices which, as noted above, have been omitted for purposes of clarity) may communicate. For example, communication network 130 may include one or more public data networks (e.g., the Internet), one or more private data networks (e.g., one or more datacenter networks, one or more enterprise networks), or the like, as well as various combinations thereof.

It will be appreciated that, although primarily presented as being arranged in a particular configuration, the various elements of wireless communication system 100 may be arranged in various other ways while still providing various functions of the autonomous wireless transmission mechanism (e.g., wireless access nodes 121 may be considered to be part of a radio access network while anchor node 122 and controller 123 may be considered to be part of a wireless packet core network, the functions of controller 123 may be distributed across multiple elements, or the like, as well as various combinations thereof).

As discussed herein, wireless communication system 100 is configured to support autonomous wireless transmissions by wireless end devices (illustratively, wireless end device 110 (as well as various other wireless end devices which, as noted above, have been omitted for purposes of clarity)) in a connectionless manner. The autonomous wireless transmissions may be supported using resources allocated in the wireless communication network 120 for autonomous wireless transmissions, which may include a set of preambles and a set of wireless resources on the air interface (which may include a set of uplink resources and a set of downlink resources). The controller 123 may be configured to allocate the resources in the wireless communication network 120 for use in supporting autonomous wireless transmissions. The controller 123 may be configured to allocate the resources to the wireless access nodes 121 for use by the wireless access nodes 121 in supporting autonomous wireless transmissions. The resources allocated by the controller 123 to a wireless access node 121 may include a set of preambles allocated for use by the wireless access node and wireless resources on the air interface of the wireless access node 121 which may be used to support autonomous wireless transmissions. The controller 123 may be configured to communicate, to the wireless access nodes 121, information indicative of the resources allocated to the wireless access nodes 121 for autonomous wireless transmissions, respectively. A wireless access node 121, upon receiving the information indicative of the resources allocated to the wireless access node 121 for autonomous wireless transmissions, may be configured to support autonomous wireless transmissions (e.g., support use of the allocated preambles, support autonomous wireless transmissions using the set of wireless resources on the air interface, and so forth). A wireless access nodes 121 may be configured to broadcast the information indicative of the resources allocated to the wireless access node 121 for autonomous wireless transmissions such that any wireless end device within range of the wireless access node 121 (e.g., the wireless end device 110 and any other wireless end devices which, as noted above, have been omitted for purposes of clarity) also receives the information indicative of the resources allocated to the wireless access node 121 for autonomous wireless transmissions and may perform autonomous wireless transmissions via the wireless access node 121 based on the information indicative of the resources allocated to the wireless access nodes 121 for autonomous wireless transmissions. The wireless end devices within range of a wireless access node 121 (e.g., wireless end device 110 and any other wireless end devices which, as noted above, have been omitted for purposes of clarity) receive the information indicative of the resources allocated to the wireless access node 121 for autonomous wireless transmissions and may perform autonomous wireless transmissions via the wireless access node 121 based on the information indicative of the resources allocated to the wireless access node 121 for autonomous wireless transmissions. The resources allocated for autonomous wireless transmissions, which are defined further below, may be further understood by first considering a general process by which wireless end device 110 may perform an autonomous wireless transmission to a wireless access node 121, which generally includes the wireless end device 110 transmitting a preamble to a wireless access node 121, the wireless access node 121 optionally transmitting a preamble acknowledgment (which may be used to avoid a payload transmission where the preamble is not detected by the wireless access node 121), the wireless end device 110 autonomously transmitting a payload to the wireless access node 121 without establishing a connection with the wireless access node 121, and the wireless access node 121 transmitting an acknowledgment to the wireless end device 110 to acknowledge successful receipt of the payload from the wireless end device 110. This general process may be further understood by way of reference to FIG. 3.

The resources allocated to a wireless access node 121 in wireless communication network 120 for autonomous wireless transmissions via the wireless access node 121 may include a set of preambles and a set of predefined wireless resources on the air interface of the wireless access node 121 (which may include a predefined set of uplink resources on the air interface and a predefined set of downlink resources on the air interface).

The set of preambles is a set of preambles supported by the wireless access node 121 for supporting autonomous wireless transmissions. In general, a preamble may be a sequence of complex symbols, which may be transmitted over a designated set of uplink resource units. For example, a preamble may be a Zadoff-Chu-like preamble sequence or other suitable type of preamble.

The predefined set of resources on the air interface of the wireless access node 121 may include uplink and downlink resources for use by wireless end devices (wireless end device 110 and others) for autonomous wireless transmissions via the wireless access node 121.

The predefined set of resources on the air interface of the wireless access node 121 may be defined and used at any suitable level of granularity. The basic unit of wireless resources may be referred to as a wireless resource unit, which may include one or more frequency-time resources (e.g., one or more subcarrier frequencies over one or more symbol periods in one or more timeslots). For example, within a 4G LTE network, a wireless resource unit may be a physical resource block (PRB), a portion of a PRB, a group of PRBs, or the like. For example, within a 4G LTE network, the set of physical resources available on the air interface may be defined as follows: one frame is 10 ms and consists of 10 sub-frames, one sub-frame is 1 ms and contains 2 slots, one slot is 0.5 ms in the time domain and each 0.5 ms assignment can contain N resource blocks [6<N<110] depending on the bandwidth allocation and resource availability, and one PRB is 0.5 ms and contains 12 subcarriers for each OFDM symbol in the frequency domain where there are 7 symbols (normal cyclic prefix) per time slot in the time domain or 6 symbols (long cyclic prefix) per time slot for a total of 84 carrier symbols (normal cyclic prefix) or 72 carrier symbols (long cyclic prefix) for the one PRB. For purpose of clarity, the predefined set of resources on the air interface which may be used for autonomous wireless transmissions is primarily presented with respect to embodiments in which wireless resource unit is a PRB; however, it will be appreciated that a wireless resource unit may be defined or organized in various other ways (e.g., for 5G implementations or other types of wireless systems). It is noted that use of physical resources available on the air interface enables in-band operation for autonomous wireless transmissions (e.g., using a normal LTE carrier, using a normal 5G carrier, or the like).

Figure 2:
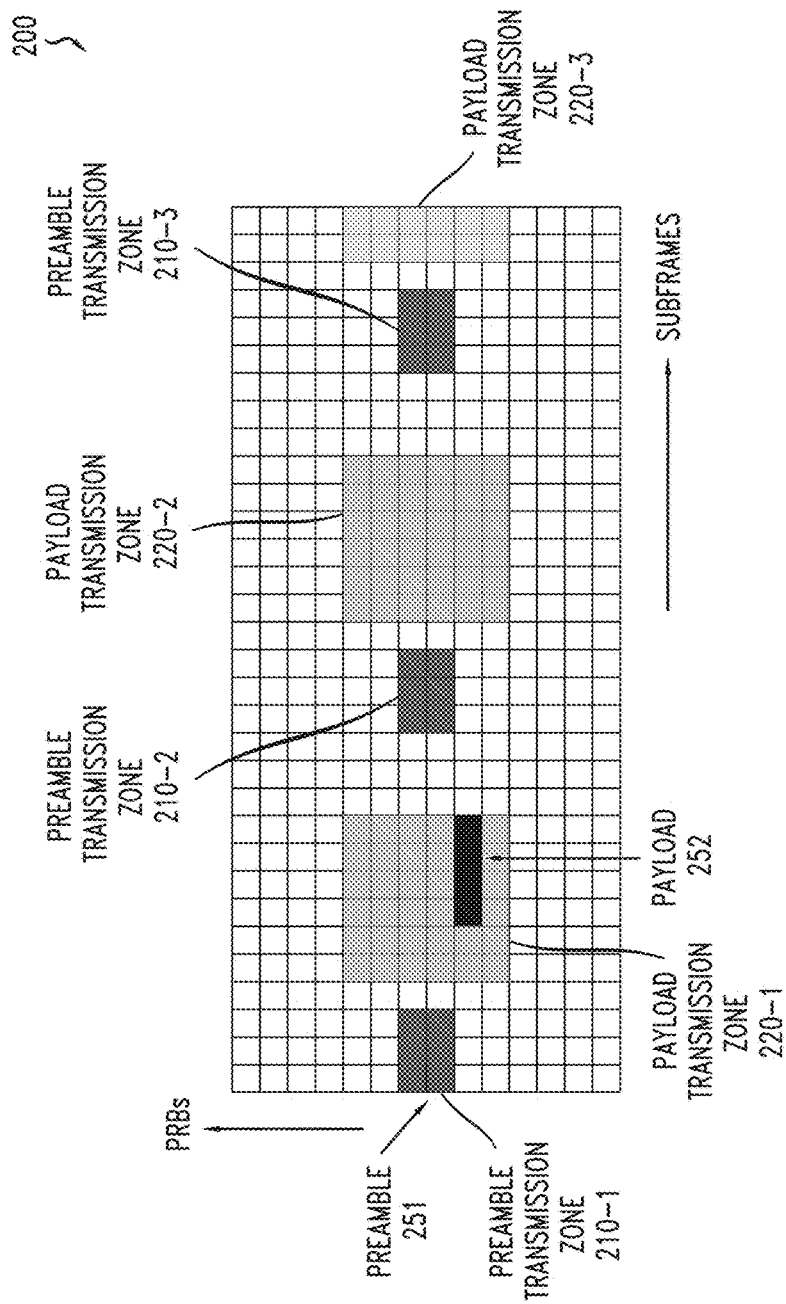
FIG. 2 depicts an exemplary set of wireless uplink resources allocated to support autonomous wireless transmissions.

The predefined set of uplink resources on the air interface of the wireless access node 121 may include a set of autonomous transmission zones within which autonomous wireless transmissions (including preamble transmissions and payload transmissions) may be performed. The set of autonomous transmission zones may include autonomous transmission zones which repeat periodically within the wireless uplink channel supported by the wireless access node 121. In general, an autonomous transmission zone of the set of autonomous transmission zones may be a set of resources dedicated for use for autonomous wireless transmissions to the wireless access node 121 (e.g., where there is no overlap with scheduled wireless transmissions to the wireless access node 121), a set of resources shared with scheduled wireless transmissions to the wireless access node 121 (in which case interference cancellation may be used by the wireless access node 121 to distinguish between the autonomous transmissions and the scheduled transmissions), or the like, as well as various combinations thereof. The set of resources of an autonomous transmission zone may include a contiguous set of resources or one or more distributed sets of resources (e.g., distributed in frequency, time, or the like, as well as various combinations thereof). The set of resources of an autonomous transmission zone may include one or more frequency-time resources (e.g., one or more subcarrier frequencies over one or more symbol periods in one or more timeslots). For example, within a 4G LTE network, the set of uplink resources of an overall autonomous transmission zone may include a set of PRBs. In general, an autonomous transmission zone of the set of autonomous transmission zones, as depicted in FIG. 2 and discussed further below, may include a preamble transmission zone configured to support transmission of preambles and a payload transmission zone configured to support transmission of payloads.

The predefined set of uplink resources on the air interface of the wireless access node 121 may include a set of preamble transmission zones defined within a set of autonomous transmission zones, respectively. The set of preamble transmission zones may include preamble transmission zones which repeat periodically within the wireless uplink channel supported by the wireless access node 121. In general, a preamble transmission zone of the set of preamble transmission zones is a set of uplink resources. The set of uplink resources of a preamble transmission zone may include a set of frequency-time resources (e.g., a set of PRBs in a 4G-based implementation, or other suitable set of frequency-time resources). For example, in a 4G-based implementation, the set of uplink resources of a preamble transmission zone may include one or more PRBs over one or more TTIs (e.g., using bundling across TTIs, where multiple TTIs are used). A preamble transmission zone may be a narrowband preamble transmission zone (e.g., within the context of a 4G-based implementation, using a relatively small number of PRBs, such as 1 PRB, 2 PRBs, 3 PRBs, or the like). A preamble transmission zone may be a narrowband preamble transmission zone which may be spread across multiple time intervals (e.g., within the context of a 4G-based implementation, spread across 2 TTIs, 3 TTIs, or the like). It has been determined that, within the context of a 4G-based implementation, where the preamble transmission is performed using 2 PRBs spread across 3 TTIs, an improvement in link budget of approximately 4.8 dB may be achieved. The set of uplink resources of a preamble transmission zone may include a set of frequency-time resources which may or may not be contiguous. The resources over which at least some of the preambles supported by a wireless access node 121 are transmitted may partially or fully overlap.

The predefined set of downlink resources on the air interface of the wireless access node 121 may include a set of preamble acknowledgment zones associated with a set of autonomous transmission zones, respectively. The set of preamble acknowledgment zones may include preamble acknowledgment zones which repeat periodically within the wireless downlink channel supported by the wireless access node 121. In general, a preamble acknowledgment zone of the set of preamble acknowledgment zones is a set of downlink resources. The set of downlink resources of the preamble acknowledgment zone may include a set of frequency-time resources (e.g., a set of PRBs in a 4G-based implementation, or other suitable set of frequency-time resources). For example, in a 4G-based implementation, the set of downlink resources of the preamble acknowledgment zone may include one or more PRBs over one or more TTIs (e.g., using bundling across TTIs, where multiple TTIs are used). The set of downlink resources of the preamble acknowledgment zone may include a set of frequency-time resources which may or may not be contiguous.

The predefined set of uplink resources on the air interface of the wireless access node 121 may include a set of payload transmission zones defined within a set of autonomous transmission zones, respectively. The set of payload transmission zones may include payload transmission zones which repeat periodically within the wireless uplink channel supported by the wireless access node 121. In general, a payload transmission zone of the set of payload transmission zones is a set of uplink resources. The set of uplink resources of a payload transmission zone may include a set of frequency-time resources (e.g., a set of PRBs in a 4G-based implementation, or other suitable set of frequency-time resources). For example, in a 4G-based implementation, the set of uplink resources of a payload transmission zone may include one or more PRBs over one or more TTIs (e.g., using bundling across TTIs, where multiple TTIs are used).

The predefined set of downlink resources on the air interface of the wireless access node 121 may include a set of payload acknowledgment zones associated with a set of autonomous transmission zones, respectively. The set of payload acknowledgment zones may include payload acknowledgment zones which repeat periodically within the wireless downlink channel supported by the wireless access node 121. In general, a payload acknowledgment zone of the set of payload acknowledgment zones is a set of downlink resources. The set of downlink resources of the payload acknowledgment zone may include a set of frequency-time resources (e.g., a set of PRBs in a 4G-based implementation, or other suitable set of frequency-time resources). For example, in a 4G-based implementation, the set of downlink resources of the payload acknowledgment zone may include one or more PRBs over one or more TTIs (e.g., using bundling across TTIs, where multiple TTIs are used). The set of downlink resources of the payload acknowledgment zone associated with a preamble may include a set of frequency-time resources which may or may not be contiguous.

It will be appreciated that the predefined resources on the air interface of the wireless access node 121, including uplink and downlink resources, for use by wireless end devices (e.g., wireless end device 110 and others) for autonomous wireless transmissions via the wireless access node 121 may be arranged in various other ways.

The resources allocated to a wireless access node 121 for autonomous wireless transmissions by wireless end devices to the wireless access node 121 may include a set of preamble indexes where each preamble index has a set of resources associated therewith, respectively. In general, a given preamble index has associated therewith a set of resources which includes: (1) a preamble (which is the sequence of complex symbols to be transmitted as the preamble), (2) a preamble transmission subzone, within the preamble transmission zone, within which the preamble is to be transmitted by the wireless end device 110 which selects the preamble index, (3) a preamble acknowledgment zone within which a preamble acknowledgment will be transmitted by the wireless access node 121 upon detecting transmission of the preamble by the wireless end device 110 in the preamble transmission subzone (in cases in which preamble acknowledgments are used), (4) a hopping sequence of resource chunks within which payload transmissions (and, when necessary, payload retransmissions) will be performed by the wireless end device 110 which selects the preamble index, and (5) identification of a payload acknowledgment zone within which a payload acknowledgment will be transmitted by the wireless access node 121 upon successfully decoding the payload transmitted by the wireless end device 110.

The set of resources associated with a preamble index, as discussed above, includes a preamble and a preamble transmission subzone. It is noted that a combination of a preamble and a preamble transmission subzone is unique for the wireless access node 121 (associated with a unique preamble index value). This allows the same preamble (i.e., same complex symbol sequence) to be used by multiple wireless end devices, since transmission of the same preamble using different preamble transmission subzones (i.e., different locations or sets of resources within the preamble transmission zone) enables different transmissions of the same preamble to be unambiguously distinguished by the wireless access node 121. This also allows the same preamble transmission subzone to be used by multiple wireless end devices, since transmission of different preambles (i.e., different complex symbol sequences) within the same preamble transmission subzone enables the different transmissions to be unambiguously distinguished by the wireless access node 121 provided the preambles have low cross-correlation. For example, 100 preamble indices may be used to uniquely represent use of 50 complex symbol sequences which each may be transmitted within two different preamble transmission subzones of the preamble transmission zone (e.g., transmission of the same complex symbol sequence by two different wireless end devices within the two preamble transmission subzones of a given preamble transmission zone may be successfully detected by the wireless access node 121 and, similarly, transmission of two or more of the complex symbol sequences within one of the preamble transmission subzones of the preamble transmission zone may be successfully detected by the wireless access node 121).

The set of resources associated with a preamble index, as discussed above, includes a hopping sequence where (1) each hop of the hopping sequence is separated in time and, possibly, frequency and (2) on each hop of the hopping sequence, a resource chunk within a payload transmission zone of an autonomous transmission zone is associated with that preamble index where the resource chunk includes a set of uplink resource units. The resource chunk on a hop of the hopping sequence associated with a preamble index is a set of uplink resource units for use by a wireless end device to perform an autonomous (re)transmission of a payload to the wireless access node. The set of uplink resource units constituting a resource chunk on a hop of a hopping sequence may be spread over M sub-carriers and N symbol periods, where M and N are suitable integers. The uplink resource units within a resource chunk on a hop of a hopping sequence may or may not be contiguous in time or frequency. The resource chunks of on the hops of a hopping sequence may be the same uplink resources of the payload transmission zone within each hop, different uplink resources of the payload transmission zone within each hop, or the like, as well as various combinations thereof. The resource chunks associated with different preamble indexes may or may not overlap.

The set of resources associated with a preamble index, as discussed above, includes a hopping sequence where, on each hop of the hopping sequence, a resource chunk within a payload transmission zone of an autonomous transmission zone is provided. A resource chunk corresponding to a hop of a hopping sequence associated with a preamble index is a subset of uplink resources within a payload transmission zone. In general a resource chunk comprises a set of frequency-time resources (e.g., a set of PRBs in a 4G-based implementation. The resource chunk may be configured to enable narrowband payload transmission using a relatively small amount of wireless uplink resources (e.g., within the context of a 4G-based implementation, using a relatively small number of PRBs, such as 1 PRB, 2 PRBs, 3 PRBs, or even a portion of a PRB) spread across multiple time intervals (TTIs) and using bundling of the multiple time intervals. It has been determined that, within the context of a 4G-based implementation, where the payload transmission is performed using 1 PRB spread across 4 TTIs, an improvement in link budget of approximately 6 dB may be achieved. The resource chunk may be configured to enable wideband payload transmission, e.g., payload transmission over a wider bandwidth which is not spread across multiple time intervals (and, thus, which does not use bundling of multiple time intervals). It will be appreciated that various combinations of such arrangements may be used (e.g., various resource chunks which may or may not use bundling across multiple time intervals); however, it also will be appreciated that a narrowband resource chunk may be particularly well-suited for at least some power-limited wireless end devices while a wideband resource chunk may be particularly well-suited for at least some non-power-limited wireless end devices. The set of uplink resources of a resource chunk associated with a hop of the hopping sequence associated with a preamble index may include a set of frequency-time resources which may or may not be contiguous.

In at least some embodiments, a hopping sequence with a single hop may be defined for a preamble index, and the resource chunk associated with that single hop may be used for each autonomous payload (re)transmission that is performed using that preamble index.

In at least some embodiments, a hopping sequence with multiple hops may be defined for a preamble index, and the resource chunks associated with those multiple hops may be used in various ways for autonomous payload (re)transmissions that are performed by a wireless end device that initiated its autonomous transmissions by transmitting the preamble corresponding to that preamble index. The multiple resource chunks associated with a preamble index may be located in different portions of the wireless uplink resources (e.g., different locations within the payload transmission zone specified within the wireless uplink resources for use for payload transmissions), respectively. For example, for a preamble index using multiple resource chunks, a first resource chunk associated with the preamble index may use a first set of frequency-time resources (e.g., a first set of PRBs in a 4G-based implementation), a second resource chunk associated with the preamble index may use a second set of frequency-time resources (e.g., a second set of PRBs in a 4G-based implementation), and so forth. In at least some embodiments, in which multiple resource chunks are associated with a preamble index, the multiple resource chunks may be specified using a hopping sequence configured to indicate the multiple resource chunks associated with that preamble index. In at least some embodiments, the hopping sequence may be a pseudo-random (or deterministic) hopping sequence. In at least some embodiments, the hopping sequence may employ frequency hopping. The hopping sequences may be different for different preamble indexes. It will be appreciated that the use of multiple resource chunks for a preamble index provides fading and interferer diversity across multiple payload transmissions by the wireless end device that is using the preamble index. It will be appreciated that, since the wireless access node 121 has information indicative of the hopping sequence for the preamble index, the wireless access node 121 is able to identify multiple transmissions from the wireless end device 110 that is using the preamble index even though the multiple transmissions may be located in different portions of the uplink resources.

In at least some embodiments, as noted above, resource chunks associated with at least some of the preamble indexes supported by a wireless access node 121 may partially or fully overlap. This enables gains in the efficiency of resource allocations, since multiple wireless end devices may share common portions of the wireless uplink resources while performing payload transmissions. The overlap between the resource chunks associated with two or more preamble indexes may be based on the hopping sequences associated with the two or more preamble indexes, respectively, and may be based on the fact that different wireless end devices may begin payload transmissions in different time intervals and, thus, that the overlap between the resource chunks of two or more preamble indexes may vary depending on the timing of the payload transmissions by the two or more preamble indexes. This may be further understood by way of reference to FIG. 6.

As discussed herein, information indicative of the resources allocated to a wireless access node 121 is provided from the controller to the wireless access node 121 and broadcast by the wireless access node 121 to make the information available to wireless end devices within range of the wireless access node 121. The information indicative of the resources allocated to the wireless access node 121 for autonomous wireless transmissions may include information defining or describing the sets of resources allocated to the wireless access node 121 for autonomous wireless transmissions, one or more rules governing use of the sets of resources allocated to the wireless access node 121 for autonomous wireless transmissions, or the like, as well as various combinations thereof. For example, the information indicative of the resources allocated to the wireless access node 121 may include a set of preamble indexes where each preamble index has information associated therewith. In general, a given preamble index has associated therewith: (1) a preamble (which is the sequence of complex symbols to be transmitted as the preamble), (2) identification of a preamble transmission subzone, within the preamble transmission zone, within which the preamble is to be transmitted by the wireless end device 110 which selects the preamble index, (3) identification of a preamble acknowledgment zone within which a preamble acknowledgment will be transmitted by the wireless access node 121 upon detecting transmission of the preamble by the wireless end device 110 in the preamble transmission subzone (in cases in which preamble acknowledgments are used), (4) identification of the hopping sequence of resource chunks within which payload (re)transmission(s) will be performed by the wireless end device 110 which selects the preamble index, and (5) identification of a payload acknowledgment zone within which a payload acknowledgment will be transmitted by the wireless access node 121 upon successfully decoding the payload transmitted by the wireless end device 110. The information indicative of the resources allocated to the wireless access node 121 for autonomous wireless transmissions may include various other types of information.

It will be appreciated that the resources allocated in wireless communication network 120 for autonomous wireless transmissions may be modified. The resources allocated in wireless communication network 120 for autonomous wireless transmissions may be modified by the wireless access nodes 121 and reported to the controller 123, modified by the controller 123 with the changes being provided to the wireless access nodes 121, or the like, as well as various combinations thereof. The modification of the resources allocated in wireless communication network 120 for autonomous wireless transmissions may be communicated by the wireless access nodes 121 to wireless end devices via modified system information related to autonomous transmissions that is broadcasted by the wireless access node 121, such that both the wireless access nodes 121 and the wireless end devices are aware of the changes and may use the allocated resources accordingly. For example, one or more characteristics of the resources may be modified, such as one or more characteristics of an autonomous transmission zone (e.g., a location of the autonomous transmission zone, a size of the autonomous transmission zone, whether or not all or part of the autonomous transmission zone overlaps with scheduled wireless transmission zones, or the like), one or more characteristic of a preamble transmission zone (e.g., location, size, or the like), one or more characteristic of a payload transmission zone (e.g., location, size, or the like), the set of carrier frequencies used, the set of timeslots used, or the like, as well as various combinations thereof. For example, the set of preambles available for use for autonomous transmissions to a wireless access node 121 may be modified. Various other aspects of autonomous transmissions by wireless end devices to wireless access nodes 121 may be modified and such modifications may be communicated to wireless end devices within range of the wireless access nodes 121.

Figure 3:
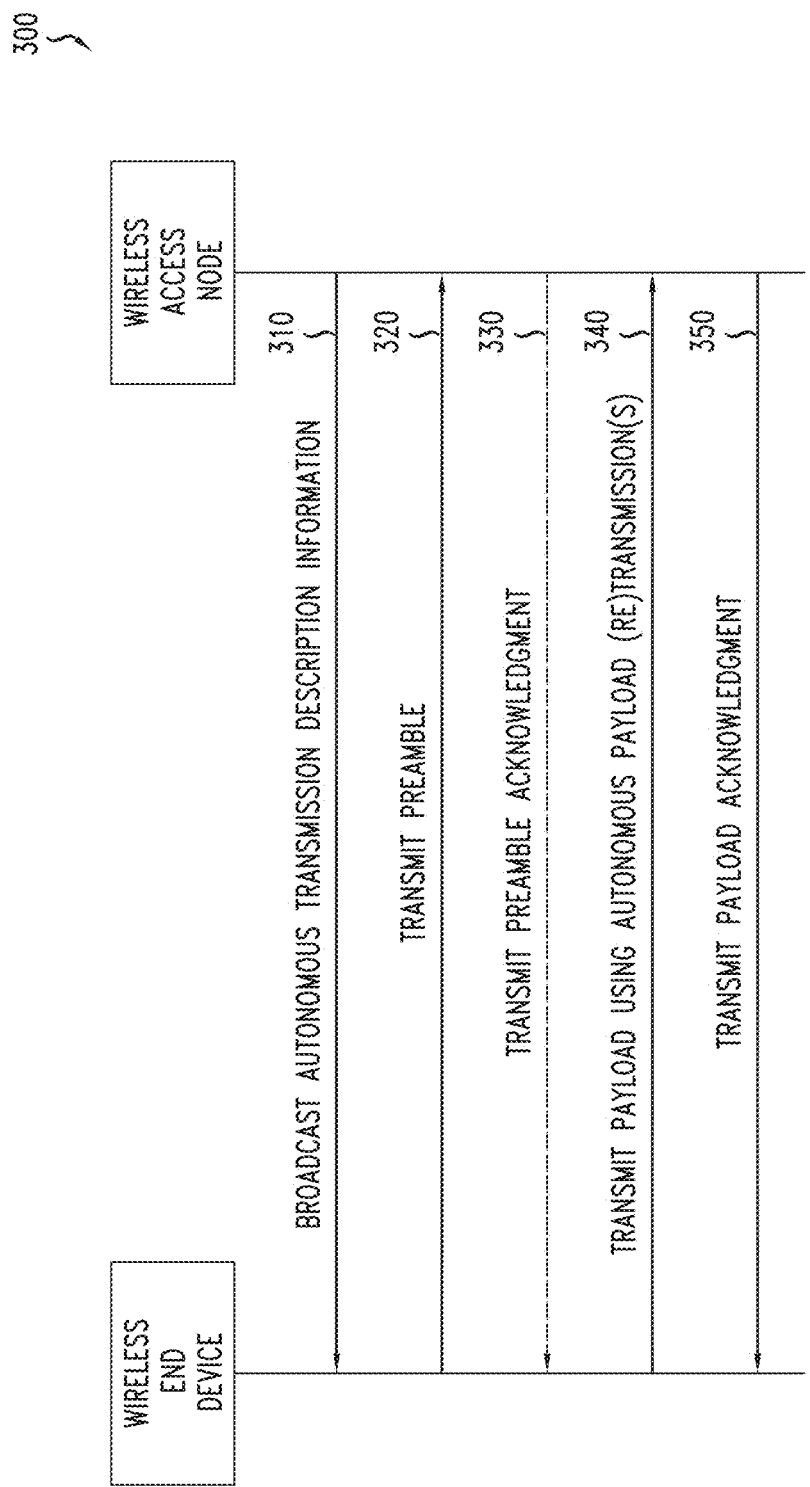
FIG. 3 depicts an exemplary embodiment of a method for autonomous wireless transmission from a wireless device to a wireless access node.

The use of autonomous wireless transmission resources, allocated in the wireless communication network 120, to support autonomous wireless transmissions may be further understood by way of reference to an exemplary set of wireless resources for use in autonomous wireless transmissions as presented with respect to FIG. 2 and an exemplary method for autonomous wireless transmission from a wireless device to a wireless access node as presented with respect to FIG. 3.

FIG. 2 depicts an exemplary set of wireless uplink resources for allocated to support autonomous wireless transmissions.

As depicted in FIG. 2, the wireless uplink resources 200 include a set of sub-frames (defined along the x-axis) where each sub-frame includes a set of frequency-time resources (defined along the Y-axis), respectively. Thus, each square depicted in the wireless uplink resources 200 represents an allocable unit of frequency-time resources which may be assigned for use in supporting autonomous wireless transmissions. As discussed herein, within the context of a 4G-based implementation, each allocable unit of frequency-time resources may correspond to a PRB (in which case each of the squares depicted in the wireless uplink resources 200 would represent a single PRB). It will be appreciated that an allocable unit of frequency-time resources may be defined in other ways (e.g., for 3G-based implementations, 5G-based implementations, or the like).

As further depicted in FIG. 2, a portion of wireless uplink resources 200 has been allocated as a set of wireless uplink resources allocated for use in supporting autonomous wireless transmissions. The wireless uplink resources allocated for use in supporting autonomous wireless transmissions include (1) a set of recurring preamble transmission zones 210-1-210-X (collectively, preamble transmission zones 210, of which three are illustrated in FIG. 2) and (2) a set of recurring payload transmission zones 220-1-220-X (collectively, payload transmission zones 220, of which three are illustrated in FIG. 2). It will be appreciated that adjacent ones of the preamble transmission zones 210-1-210-X and payload transmission zones 220-1-220-X may constitute a set of autonomous transmission zones (e.g., preamble transmission zone 210-1 and payload transmission zone 220-1 constitute a first autonomous transmission zone, preamble transmission zone 210-2 and payload transmission zone 220-2 constitute a second autonomous transmission zone, and so forth).

As further depicted in FIG. 2, the wireless uplink resources allocated for use in supporting autonomous wireless transmissions have specific locations (within the wireless uplink resources 200) and also have specific sizes (in terms of the numbers of PRBs allocated). The preamble transmission zones 210 each include a set of 6 PRBs (2 PRBs in each of three contiguous sub-frames). The payload transmission zones 220 each include a set of 48 PRBs (6 PRBs in each of eight contiguous sub-frames). Additionally, there is a gap of one sub-frame between a preamble transmission zone 210 and a payload transmission zone 220 that make up an autonomous transmission zone. It will be appreciated that the locations and sizes of the preamble transmission zones 210 and payload transmission zones 220 are merely exemplary and that various other locations may be used, various other sizes may be used, or the like, as well as various combinations thereof. It will be appreciated that the gaps between the preamble transmission zones 210 and the corresponding payload transmission zones 220 are merely exemplary and that various other gap sizes may be used.

As further depicted in FIG. 2, the wireless uplink resources allocated for use in supporting autonomous wireless transmissions have specific locations (within the wireless uplink resources 200) and also have specific sizes (in terms of the numbers of PRBs allocated) that define thereby a relationship between adjacent ones of the recurring autonomous transmission zones. For example, there is a gap of three sub-frames between adjacent autonomous transmission zones (illustratively, between the end of a payload transmission zone 220 of a given autonomous transmission zone and the beginning of a preamble transmission zone 210 of a next autonomous transmission zone). It will be appreciated that the gaps between adjacent ones of the autonomous transmission zones are merely exemplary and that various other gap sizes may be used.

It is noted that FIG. 2 further depicts a preamble 251 and a payload 252 being transmitted using the wireless uplink resources 200 (and, more specifically, using the first autonomous transmission zone including the first preamble transmission zone 210-1 and the first payload transmission zone 220-1). The preamble 251, which comprises a complex sequence of appropriate size, is transmitted over all 6 PRBs of the preamble transmission zone 210-1. It will be appreciated that although primarily depicted with respect to an embodiment in which the preamble 251 is transmitted over the entire preamble transmission zone 210-1, in at least some embodiments, the preamble 251 may be transmitted over a portion of the preamble transmission zone 251 (e.g., a preamble transmission subzone within preamble transmission zone 251). The payload 252 is transmitted over a resource chunk comprising 4 PRBs from the set of 48 PRBs of the payload transmission zone 220-1, where the location of these four PRBs within payload transmission zone 220-1 is dictated by the hopping sequence associated with the preamble index. It will be appreciated that other locations within payload transmission zones 220 may be dedicated for use with other preamble indexes which may be selected by other wireless end devices for autonomous wireless transmissions.

It will be appreciated that the specific locations and sizes of the preamble transmission zones 210 and payload transmission zones 220 are merely exemplary and that various other locations and sizes (as well as arrangements with respect to each other and so forth) may be supported.

FIG. 3 depicts an exemplary embodiment of a method for autonomous wireless transmission from a wireless device to a wireless access node. It will be appreciated that, although the functions of method 300 are primarily presented as being performed serially, at least a portion of the functions of method 300 may be performed contemporaneously or in a different order than as presented in FIG. 3.

At step 310, the wireless access node broadcasts autonomous transmission description information which is received by the wireless end device. The wireless end device may already be active and able to receive the autonomous transmission description information, or may wake up based on detection of a condition (e.g., a condition indicative that the wireless end device is to transmit data via the wireless uplink) to be active and able to receive the autonomous transmission description information. The autonomous transmission description information may include information defining or describing the sets of resources allocated in wireless communication network for autonomous wireless transmissions, one or more rules governing use of the sets of resources allocated in wireless communication network for autonomous wireless transmissions, or the like, as well as various combinations thereof.

At step 320, the wireless end device transmits a preamble to the wireless access node. The wireless end device selects a preamble index specified in the autonomous transmission description information. The selected preamble index has associated therewith the preamble and an indication of the preamble transmission subzone within which to transmit the preamble. The wireless end device transmits the preamble in the preamble transmission subzone associated with the preamble index. The preamble transmission subzone is a set of frequency-time resources, on the wireless uplink. The wireless access node may obtain, from the preamble, timing information which the wireless access node may then use for payload demodulation upon receiving the payload from the wireless end device in the payload transmission zone(s).

At step 330 (which may be an optional step), the wireless access node transmits a preamble acknowledgment to the wireless end device. The preamble acknowledgment provides an indication to the wireless end device that the wireless access node successfully detected the preamble and, thus, that the wireless end device may transmit the payload. The wireless access node transmits the preamble acknowledgment in a preamble acknowledgment zone. The preamble acknowledgment zone is a set of frequency-time resources, on the downlink, associated with the preamble index. The wireless access node determines the location of the preamble acknowledgment zone within which to transmit the preamble acknowledgment based on identification of the preamble index associated with the preamble transmitted by the wireless end device. The wireless end device determines the location of the preamble acknowledgment zone within which to monitor for the preamble acknowledgment based on the preamble index selected by the wireless end device.

At step 340, the wireless end device transmits a payload to the wireless access node.

The wireless end device transmits the payload to the wireless access node autonomously in a connectionless manner. For example, within the context of 4G wireless transmissions, autonomous and connectionless transmission of the payload may be performed without a Radio Resource Control (RRC) transaction between the wireless end device and the wireless access node (e.g., without the wireless end device sending an RRC Connection Request and without the wireless access node sending an RRC Connection Setup) and, thus, without acquiring a Cell-Radio Network Temporary Identifier for each payload transmission. The wireless end device may transmit the payload using one or more autonomous payload transmissions, which includes an initial autonomous payload transmission and one or more autonomous payload retransmissions. The one or more autonomous payload transmissions may each be performed by the wireless end device without establishing a connection to the wireless access node. The initial autonomous payload transmission is performed after transmission of the preamble. The initial autonomous payload transmission may be performed without waiting for reception of a preamble acknowledgment from the wireless access node (e.g., where a preamble acknowledgment is not used) or based on reception of a preamble acknowledgment from the wireless access node (e.g., where a preamble acknowledgment is used and, thus, is expected by the wireless end device). The one or more autonomous payload retransmissions may be performed without retransmitting the preamble. The one or more autonomous payload retransmissions may be performed based on a condition detected by the wireless end device (e.g., failure to receive a payload acknowledgment for a given payload (re)transmissions, a determination that the payload is unlikely to be successfully received by the wireless access node using a single payload transmission or less than N payload (re)transmissions, or the like). The wireless end device may perform a sequence of autonomous payload (re)transmissions using a hopping sequence associated with the preamble index selected by the wireless end device (where the hopping sequence provides a sequence of resource chunks over which the sequence of autonomous payload (re)transmissions may be performed). The resource chunks associated with different hops on the hopping sequence associated with the preamble may occur at the same location within the respective payload transmission zones, may occur at different locations within the respective payload transmission zones, or combinations thereof. The wireless end device may (re)transmit the payload to the wireless access node using a modulation and coding scheme (MCS). The MCS that is used by the wireless end device may be a fixed MCS that has been pre-selected for autonomous payload transmissions (which enables lower complexity in narrowband devices). The MCS that is used by the wireless end device may be one of a set of multiple MCSs that are predefined for autonomous payload transmissions. The wireless end device may transmit the payload to the wireless access node without including any training sequence for timing recovery by the wireless access node. The wireless end device may include within the payload a device identifier of the wireless end device (e.g., a UE identifier or other suitable identifier of the wireless end device), which may be used by the wireless end device to correlate payload acknowledgments to payloads and which may be used by the wireless end device and the wireless access node for higher layer processing. These and various other functions supported by the wireless end device may be further understood by way of reference to FIG. 4.

The wireless access node receives the payload from the wireless end device based on the autonomous transmission of the payload by the wireless end device. The wireless access node may detect transmission of a preamble by the wireless end device. The wireless access node may recover the payload transmitted by the wireless end device by receiving and decoding one or more signals associated with one or more autonomous payload transmissions by the wireless end device, which includes an initial autonomous payload transmission and one or more autonomous payload retransmissions. The one or more signals associated with the one or more autonomous payload transmissions by the wireless end device may each be received and processed by the wireless access node without establishment of a connection with the wireless end device. The signal associated with the initial autonomous payload transmission by the wireless end device may be received after the wireless access node detects transmission of a preamble by the wireless end device. The one or more signals associated with the one or more autonomous payload retransmissions by the wireless end device may be decoded without detecting retransmission of the preamble by the wireless end device (since the wireless end device may initiate each autonomous payload retransmission without resending the preamble). The one or more autonomous payload retransmissions may be received based on a condition detected by the wireless access node (e.g., a determination that decoding of one or more signals to recover a payload transmitted by the wireless end device was unsuccessful, a determination that the wireless end device is autonomously transmitting the payload to the wireless access node using a sequence of two or more autonomous payload (re)transmissions (which may be determined by the wireless access node based on some information received by the wireless access node from the wireless end device, such as based on the preamble index selected or information encoded in or provided with the preamble), or the like). The wireless access node may receive a sequence of autonomous payload (re)transmissions using a hopping sequence associated with the preamble index selected by the wireless end device (where the hopping sequence provides a sequence of resource chunks over which the sequence of autonomous payload (re)transmissions may be performed). The resource chunks associated with different hops on the hopping sequence associated with the preamble may occur at the same location within the respective payload transmission zones, may occur at different locations within the respective payload transmission zones, or combinations thereof. These and various other functions supported by the wireless access node may be further understood by way of reference to FIG. 5.

At step 350, the wireless access node transmits a payload acknowledgment to the wireless end device. The payload acknowledgment provides an indication to the wireless end device that the wireless access node successfully decoded the payload. The wireless access node transmits the payload acknowledgment in a payload acknowledgment zone. The payload acknowledgment zone is a set of frequency-time resource, on the downlink, associated with the preamble index. The wireless access node determines the location of the payload acknowledgment zone within which to transmit the payload acknowledgment based on identification of the preamble index associated with the preamble transmitted by the wireless end device. The wireless end device determines the location of the payload acknowledgment zone within which to monitor for the payload acknowledgment based on the preamble index selected by the wireless end device. It will be appreciated that, although primarily presented with respect to an embodiment in which a single payload acknowledgment is transmitted from the wireless access node to the wireless end device (e.g., where the payload is communicated from the wireless end device to the wireless access node using one or more autonomous payload transmissions), in at least some embodiments, in which the payload is communicated from the wireless end device to the wireless access node using multiple autonomous payload transmissions, the wireless access node may transmit autonomous payload transmission acknowledgments for each of the multiple autonomous payload transmissions, respectively.

Figure 4:
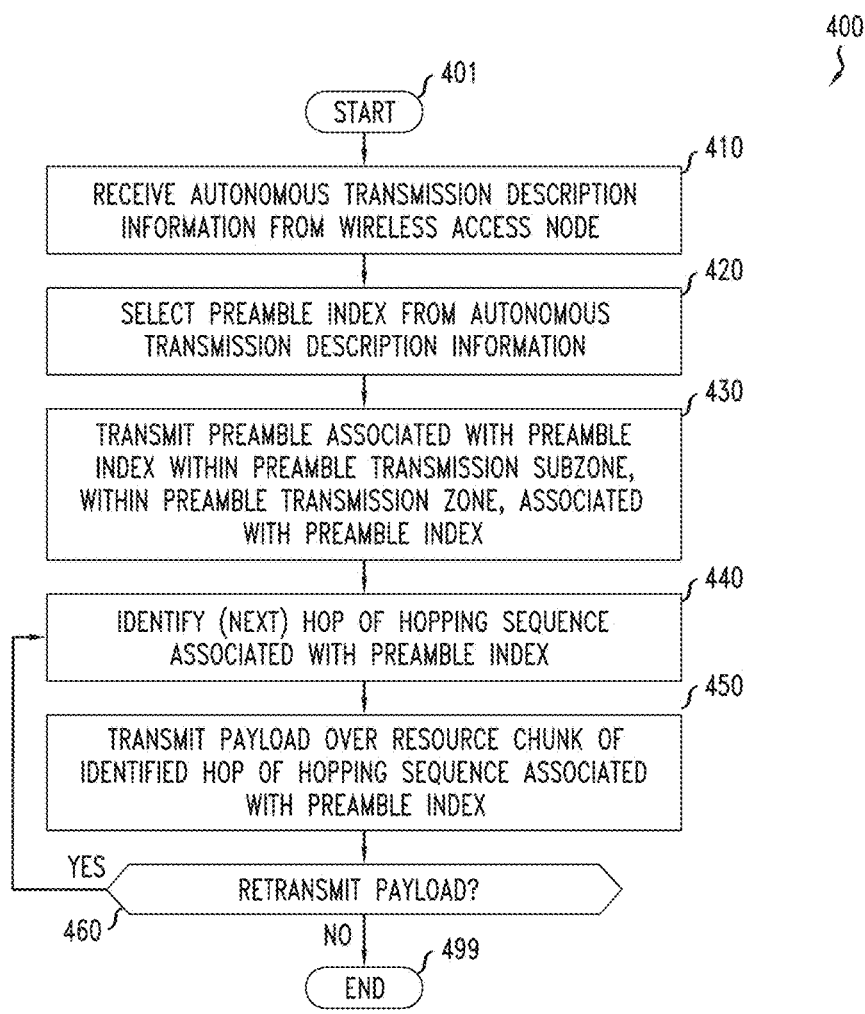
FIG. 4 depicts an exemplary embodiment of a method for use by a wireless end device to perform an autonomous wireless transmission to a wireless access node.
Figure 5:
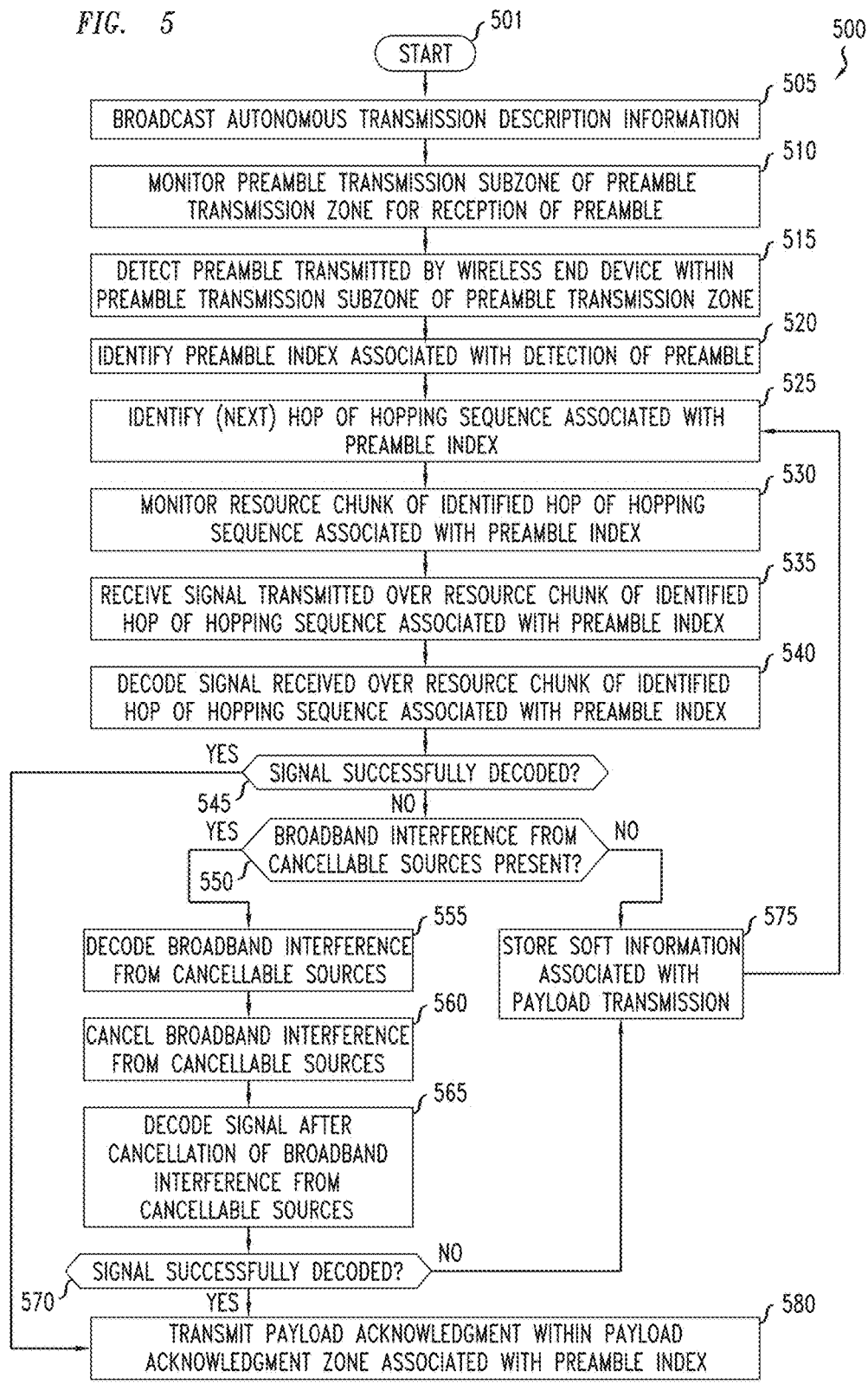
FIG. 5 depicts an exemplary embodiment of a method for use by a wireless access node to receive an autonomous wireless transmission from a wireless end device.

It will be appreciated that the functions performed by the wireless end device and the wireless access node in supporting autonomous wireless transmission from the wireless device to the wireless access node may be further understood by way of reference to FIGS. 4 and 5.

FIG. 4 depicts an exemplary embodiment of a method for use by a wireless end device to perform an autonomous wireless transmission to a wireless access node. It is noted that method 400 may be executed under various conditions (e.g., when the wireless end device wakes up, when the wireless end device determines that a payload is to be transmitted, or the like). It is assumed, for purposes of clarity, that preamble acknowledgment is not being used. It will be appreciated that, although the functions of method 400 are primarily presented as being performed serially, at least a portion of the functions of method 400 may be performed contemporaneously or in a different order than as presented.

At block 401, method 400 begins.

At block 410, the wireless end device receives autonomous transmission description information from the wireless access node. The autonomous transmission description information includes information which may be used by the wireless end device to perform an autonomous wireless transmission to the wireless access node. The autonomous description information includes a set of preamble indexes where each of the preamble indexes has associated therewith respective autonomous transmission information associated with the respective preamble index. The wireless end device may receive the autonomous transmission description information from the wireless access node after first acquiring open loop synchronization.

At block 420, the wireless end device selects one of the preamble indexes identified in the autonomous transmission description information. The selected preamble index has associated therewith a preamble, an indication of a preamble transmission subzone, an indication of a hopping sequence of resource chunks within payload transmission zones, and an indication of a payload acknowledgment zone. The selection of the preamble may be based on an identifier associated with the wireless end device.

At block 430, the wireless end device transmits the preamble of the selected preamble index within the preamble transmission subzone, within the preamble transmission zone, associated with the preamble index.

At block 440, the wireless end device identifies a (next) hop of the hopping sequence associated with the preamble index. In a first pass through block 440 of method 400, the first hop of the hopping sequence is identified. In each subsequence pass through block 440 of method 400 (e.g., for a retransmission(s)), the respective next hop of the hopping sequence is identified. The hop of the hopping sequence specifies a resource chunk of a payload transmission zone.

At block 450, the wireless end device transmits the payload over the resource chunk of the identified hop of the hopping sequence associated with the preamble index. The wireless end device transmits the payload without establishing a connection to the wireless access node (and, thus, without the need to obtain scheduling grants from the wireless access node prior to transmission). The transmission of the payload may be performed using suitable modulation and encoding (e.g., using one of a set of MCSs predefined for autonomous transmissions). The payload may include an identifier of the wireless end device (e.g., for use by the wireless access node in providing a payload acknowledgment if the payload is successfully received by the wireless access node and for use by the wireless end device in identifying a payload acknowledgment sent by the wireless access node if the payload is successfully received by the wireless access node). The transmission of the payload may be an initial transmission of the payload (in a first pass through block 450 of method 400) or a retransmission of the payload (in any subsequent pass through block 450 of method 400). It is noted that a retransmission of the payload may involve resending the payload (e.g., resending the payload that was transmitted on the previous attempt, so that the receiver may employ chase-combining) or sending a suitable redundancy version of the payload (e.g., if an incremental-redundancy scheme is being used). It is noted that a retransmission of the payload is performed without retransmitting the preamble.

At block 460, the wireless end device determines whether to retransmit the payload. The determination as to whether to retransmit the payload may be based on a condition detected by the wireless end device.

The determination as to whether to retransmit the payload may be based on a first type of condition detected by the wireless end device. The first type of condition may be a determination that a payload acknowledgment for the payload was not received within a payload acknowledgment zone associated with the preamble index. The determination that a payload acknowledgment for the payload was not received within a payload acknowledgment zone associated with the preamble index may be made by monitoring a payload acknowledgment zone associated with the preamble index for reception of a payload acknowledgment from the wireless access node. The wireless end device may monitor for reception of a payload acknowledgment from the wireless access node by monitoring the payload acknowledgment zone for a payload acknowledgement including the wireless end device identifier of the wireless end device.

The determination as to whether to retransmit the payload may be based on a second type of condition detected by the wireless end device. The second type of condition may be a determination by the wireless end device that the payload is to be transmitted toward the wireless access node multiple times. The second type of condition may be used based on a determination by the wireless end device that the payload is unlikely to be successfully received by the wireless access node using only a single transmission of the payload (e.g., where the wireless end device is in an area with poor signal quality). For the second type of condition, the wireless end device may pre-determine the number of times that the payload is to be transmitted (e.g., 2, 3, 5, or the like). It will be appreciated that the number of times that the payload is transmitted for the second type of condition may vary for transmissions of different payloads by the wireless end device (e.g., based on different signal conditions at the different times of the different payload transmissions).

It is noted that various combinations of the first and second condition types may be used (e.g., the wireless end device decides to transmit the payload up to N total times (N≥2) or until an acknowledgment is received in the payload acknowledgment zone, the wireless end device decides to transmit the payload at least M total times and up to N total times (N≥M) and begins monitoring for payload acknowledgments after the first M transmissions, or the like).

As noted above, the determination as to whether to retransmit the payload may be based on a condition detected by the wireless end device. If a determination is made that the payload is to be retransmitted, method 400 returns to block 440 (at which point the wireless end device identifies the next hop of the hopping sequence associated with the preamble index and, thus, the next resource chunk within the next payload transmission zone that is to be used to retransmit the payload to the wireless access node). If a determination is made that the payload is not to be transmitted, method 400 proceeds to block 499 (where method 400 ends).

At block 499, method 400 ends.

It will be appreciated that, although method 400 is primarily presented with respect to embodiments in which the wireless end device is configured to attempt (re)transmission of the payload any number of times, in at least some embodiments the wireless end device may be configured to only attempt (re)transmission of the payload a threshold number of times. In at least some such embodiments, for example, when the threshold on the number of (re)transmission attempts is satisfied, further (re)transmission attempts are not performed or not performed until a condition is satisfied (e.g., waiting for a threshold length of time before a next attempt to (re)transmit the payload, transmitting a preamble in order to restart the process of trying to transmit the payload, or the like, as well as various combinations thereof).

It will be appreciated that, although omitted from FIG. 4 for purposes of clarity, the wireless end device, following successful transmission of the payload to the wireless access node, may remain in an active state and initiate a next autonomous transmission, remain in an active state without initiating a next autonomous transmission, enter a sleep state, or the like.

FIG. 5 depicts an exemplary embodiment of a method for use by a wireless access node to receive an autonomous wireless transmission from a wireless end device. It is assumed, for purposes of clarity, that preamble acknowledgment is not being used. It will be appreciated that, although the functions of method 400 are primarily presented as being performed serially, a portion of the functions of method 500 may be performed contemporaneously or in a different order than as presented in FIG. 5.

At block 501, method 500 begins.

At block 505, the wireless access node broadcasts autonomous transmission description information. The autonomous transmission description information includes information which may be used by the wireless access node to support an autonomous wireless transmission by the wireless end device. The autonomous description information includes a set of preamble indexes where each of the preamble indexes has associated therewith respective autonomous transmission information associated with the respective preamble index.

At block 510, the wireless access node monitors a preamble transmission subzone of a preamble transmission zone for reception of a preamble.

At block 515, the wireless access node detects a preamble transmitted by the wireless end device in the preamble transmission subzone of the preamble transmission zone. In at least some embodiments, the preamble detection process used by the wireless access node may be similar to the preamble detection process used by an eNodeB for the LTE Physical Random Access Channel (PRACH).

At block 520, the wireless access node identifies a preamble index associated with the detection of the preamble. The preamble index is identified based on a combination of the preamble detected and the preamble transmission subzone within which the preamble was detected. The identified preamble index, as discussed herein, has associated therewith additional autonomous transmission information which may be used by the wireless access node to support an autonomous payload transmission that will be performed by the wireless end device (e.g., the hopping sequence, the payload acknowledgment zone, and so forth).

At block 525, the wireless access node identifies the (next) hop of the hopping sequence associated with the preamble index. In a first pass through block 525 of method 500, the first hop of the hopping sequence is identified. In each subsequence pass through block 525 of method 500 (e.g., for a retransmission(s)), the respective next hop of the hopping sequence is identified. The hop of the hopping sequence specifies a resource chunk of a payload transmission zone.

At block 530, the wireless access node monitors the resource chunk associated with the identified hop of the hopping sequence associated with the preamble index for reception of a payload transmitted by the wireless end device which transmitted the preamble. The wireless access node monitors the resource chunk (for each (re)transmission of the payload) without establishment of a connection between the wireless access node and the wireless end device. The wireless access node monitors the resource chunk (for each retransmission of the payload) without expecting receipt of the preamble from the wireless end device (e.g., the preamble is only transmitted by the wireless end device in the initial transmission and, thus, is not expected by the wireless access node prior to any retransmissions of the payload by the wireless end device).

At block 535, the wireless access node receives a signal transmitted by the wireless end device over the resource chunk associated with the identified hop of the hopping sequence associated with the preamble index. The received signal includes the payload transmitted by the wireless end device. This may be the payload in a first transmission of the payload by the wireless end device or the payload or a redundancy version of the payload in a subsequent retransmission of the payload by the wireless end device.

At block 540, the wireless access node decodes the signal received over the resource chunk, associated with the identified hop of the hopping sequence associated with the preamble index. The wireless access node decodes the signal to attempt to recover the payload transmitted by the wireless end device. It is noted that, if this is not the first attempt to decode a signal to recover the payload, then decoding of the signal may use soft information from any previous attempts to decode any previous signals carrying the payload (stored at block 575, as discussed further below).

At block 545, the wireless access node determines whether decoding of the signal received over the resource chunk associated with the identified hop of the hopping sequence associated with the preamble index, to recover the payload transmitted by the wireless end device, was successful. If the wireless access node was able to successfully decode the signal received over the resource chunk to recover the payload, method 500 proceeds to block 580. If the wireless access node was unable to successfully decode the signal received over the resource chunk to recover the payload, method 500 proceeds to block 550.

At block 550, the wireless access node determines whether broadband interference from cancellable sources is present. If broadband interference from cancellable sources is not present, method 500 proceeds to block 575. If broadband interference from cancellable sources is present, method 500 proceeds to block 555.

At block 555, the wireless access node decodes the broadband interference from cancellable sources.

At block 560, the wireless access node cancels the broadband interference from cancellable sources.

At block 565, the wireless access node attempts to decode the signal received over the resource chunk associated with the identified hop of the hopping sequence associated with the preamble index.

At block 570, the wireless access node determines whether decoding of the signal received over the resource chunk associated with the identified hop of the hopping sequence associated with the preamble index, to recover the payload transmitted by the wireless end device, was successful. If the wireless access node was able to successfully decode the signal received over the resource chunk to recover the payload, method 500 proceeds to block 580. If the wireless access node was unable to successfully decode the signal received over the resource chunk to recover the payload, method 500 proceeds to block 575.

At block 575, the wireless access node stores soft information associated with the payload transmission (which it may use in order to help in decoding any retransmissions of the payload which may be attempted by the wireless end device. From block 570, method 500 returns to block 525 (at which point the next hop of the hopping sequence associated with the preamble index is identified so that the wireless access node can monitor for retransmission of the payload by the wireless end device).

At block 580, the wireless access node transmits a payload acknowledgment within the payload acknowledgment zone associated with the preamble index. The payload acknowledgment may include the identifier of the wireless end device (e.g., from the preamble and/or the payload transmitted by the wireless end device). From block 580, method 500 proceeds to block 599 (where method 500 ends).

At block 599, method 500 ends.

It will be appreciated that, although method 500 is primarily presented with respect to embodiments in which the wireless access node is configured to determine whether broadband interference from cancellable sources is present and to attempt to decode and cancel broadband interference from cancellable sources when broadband interference from cancellable sources is present (e.g., it is assumed that autonomous transmissions may overlap with scheduled transmissions, perhaps where the system is configured to support this type of overlap), in at least some embodiments the wireless access node may not be configured to determine whether broadband interference from cancellable sources is present (e.g., the wireless access node may not support such functions, where the system is designed such that this type of overlap is not permitted, and so forth). In at least some such embodiments, for example, method 500 may be modified by eliminating blocks 550-570 and modifying method 500 to proceed from block 545 to block 575 based on a determination at block 545 that decoding of the payload received over the resource chunk associated with the identified hop of the hopping sequence associated with the preamble index was unsuccessful.

It will be appreciated that, although method 500 is primarily presented with respect to embodiments in which the wireless access node is configured to determine whether decoding of a signal is successful (resulting in successful recovery of the payload transmitted by the wireless end device) after each signal is received by the wireless access node, in at least some embodiments the wireless access node may not determine whether decoding of a signal is successful (resulting in successful recovery of the payload transmitted by the wireless end device) after each signal is received by the wireless access node. In at least some embodiments, for example, after attempting to decode a most recently received signal, the wireless access node may simply monitor for receipt of a next signal (based on the hopping sequence) without determining whether decoding of the most recently received signal was successful. This may be useful where the wireless access node has information indicating that the wireless end device is planning to transmit the payload over a sequence of multiple payload transmissions (e.g., where the wireless end device makes a determination that the payload is unlikely to be successfully received by the wireless access node using a single payload transmission and, thus, pre-determines that the payload will be transmitted multiple times), which may be communicated from the wireless end device to the wireless access node (e.g., communicated based on the preamble index selected, based on information encoded in or provided with the preamble, or the like, as well as various combinations thereof). In at least some such embodiments, blocks 545 and 570 may be modified to be determinations as to whether a condition has been detected by the wireless access node, where the condition may be a determination that decoding of one or more signals to recover a payload transmitted by the wireless end device was unsuccessful, a determination that the wireless end device is autonomously transmitting the payload to the wireless access node using a sequence of two or more autonomous payload (re)transmissions, or the like, as well as various combinations thereof.

It will be appreciated that, although omitted from FIG. 5 for purposes of clarity, the wireless access node, based on successful decoding of the payload, may provide the payload to upper layers for additional processing.

Figure 6:
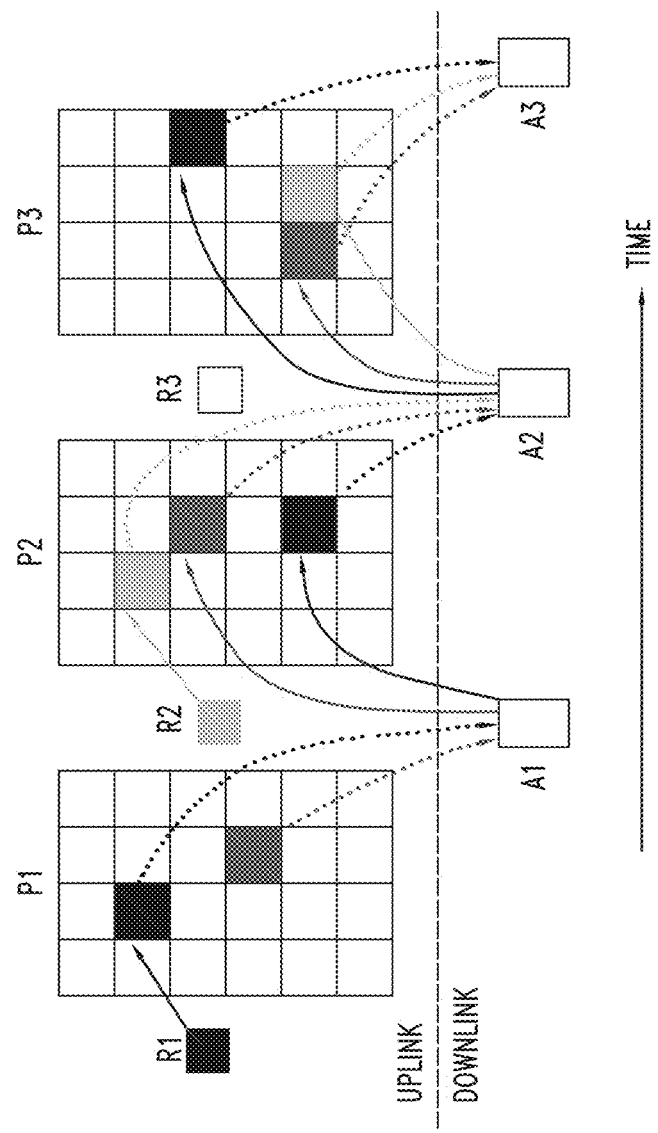
FIG. 6 depicts an exemplary use of wireless resources to support autonomous transmissions by multiple wireless end devices.

FIG. 6 depicts an exemplary use of wireless resources to support autonomous transmissions by multiple wireless end devices.

As depicted in FIG. 6, autonomous wireless transmissions by three wireless end devices (denoted as U1, U2, and U3) are performed over time using three autonomous transmission zones that are depicted. The three autonomous transmission zones include: (1) a first autonomous transmission zone (denoted as Z1) including a first preamble transmission zone R1 and a first payload transmission zone P1, (2) a second autonomous transmission zone (denoted as Z2) including a second preamble transmission zone R2 and a second payload transmission zone P2, and (3) a third autonomous transmission zone (denoted as Z3) including a third preamble transmission zone R3 and a third payload transmission zone P3. The payload acknowledgments for payloads successfully transmitted in autonomous transmission zones Z1, Z2, and Z3 are delivered via associated payload acknowledgment zones defined in downlink wireless resources (denoted A1, A2, and A3, respectively). It is noted that references hereinbelow to box (x,y) are measured from the top-left corner of the payload transmission zone and are meant to identify the box that is x boxes to the right and y boxes down from the top-left corner of the payload transmission zone.

As depicted in FIG. 6, it is assumed that wireless end device U1 performs an autonomous wireless transmission using a first preamble associated with a first preamble index having a first hopping sequence associated therewith (where the hopping sequence includes box (2,2), box (3,5), box (4,3), and so forth, where these boxes represent the locations of the resource chunks of the first hopping sequence associated with the first preamble index), the wireless end device U2 performs an autonomous wireless transmission using a second preamble associated with a second preamble index having a second payload hopping sequence associated therewith (where the hopping sequence is box (3,4), box (3,3), box (2,5), and so forth, where these boxes represent the locations of the resource chunks of the second hopping sequence associated with the second preamble index), and the wireless end device U3 performs an autonomous wireless transmission using the first preamble associated with the first preamble index that was used by wireless end device U1 (i.e., wireless end devices U1 and U3 share the same payload hopping sequence).

As depicted in FIG. 6, wireless end devices U1 and U2 have begun their autonomous transmissions in autonomous transmission zone Z1 (illustratively, wireless end devices U1 and U2 transmit their respective preambles within first preamble transmission zone R1 of autonomous transmission zone Z1). The first preamble index associated with the first preamble used by wireless end device U1 has a first hopping sequence associated therewith (with an initial resource chunk in box (2,2)) and the second preamble index associated with the second preamble used by wireless end device U2 has a second hopping sequence associated therewith (with an initial resource chunk in box (3,4)). As such, after wireless end devices U1 and U2 transmit their respective preambles, wireless end device U1 transmits its payload in the resource chunk corresponding to box (2,2) of first payload transmission zone P1 and wireless end device U2 transmits its payload in the resource chunk corresponding to box (3,4) of first payload transmission zone P1, such that these payload transmissions do not interfere with each other. After transmitting their payloads, wireless end device U1 and wireless end device U2 wait for their respective payload acknowledgments which are expected to be delivered via the first payload acknowledgment zone A1 associated with first payload transmission zone P1.

As depicted in FIG. 6, it is assumed that the autonomous payload transmissions by the wireless end devices U1 and U2 in autonomous transmission zone Z1 were not successful (neither wireless end device U1 nor wireless end device U2 received its payload acknowledgment in the first payload acknowledgment zone A1 associated with first payload transmission zone P1). As a result, wireless end devices U1 and U2 each retransmit their payloads in the second payload transmission zone P2 of autonomous transmission zone Z2 (illustratively, the wireless end device U1 retransmits its payload in the resource chunk corresponding to box (3,3) of second payload transmission zone P2 as dictated by the hopping sequence associated with the first preamble index associated with the first preamble being used by the wireless end device U1 and the wireless end device U2 retransmits its payload in the resource chunk corresponding to box (3,5) of second payload transmission zone P2 as dictated by the payload hopping sequence associated with the second preamble index associated with the second preamble being used by the wireless end device U2, such that these payload retransmissions do not interfere with each other). After retransmitting their payloads, wireless end device U1 and wireless end device U2 again wait for their respective payload acknowledgments which are expected to be delivered via the second payload acknowledgment zone A2 associated with second payload transmission zone P1.

As depicted in FIG. 6, in parallel with the autonomous payload retransmissions performed by the wireless end devices U1 and U2 in autonomous transmission zone Z2, the wireless end device U3 initiates an autonomous wireless transmission in autonomous transmission zone Z2. As indicated above, wireless end device U3 is using the first preamble, associated with the first preamble index, which was also used by wireless end device U1. The wireless end device U3 transmits the first preamble within second preamble transmission zone R2 of autonomous transmission zone Z2 and then transmits its payload in the resource chunk corresponding to box (2,2) of the payload transmission zone P2 (since this is the first location indicated in the hopping sequence for the first preamble index). However, even though wireless end device U1 and wireless end device U3 are using the same preamble, their payload transmissions do not interfere since wireless end device U3 began its autonomous wireless transmission later in time than wireless end device U1 began its autonomous wireless transmission (such that the two payload hopping sequences are separated in time). After transmitting its payload, wireless end device U3 also waits for its respective payload acknowledgment which is expected to be delivered via the second payload acknowledgment zone A2 associated with second payload transmission zone P2.

Figure 7:
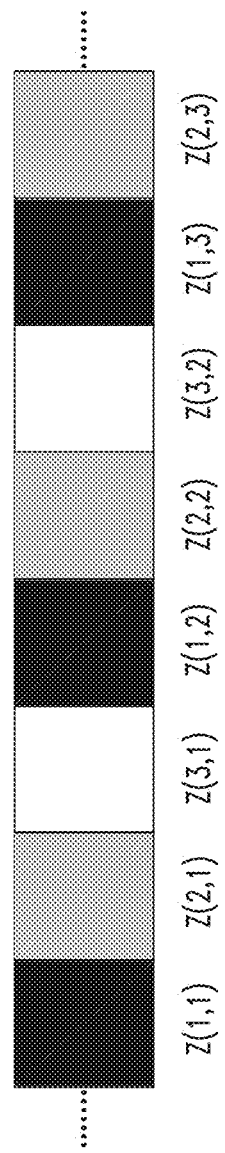
FIG. 7 depicts an exemplary configuration of wireless resources to support autonomous transmissions by multiple wireless end devices.

FIG. 7 depicts an exemplary configuration of wireless resources to support autonomous transmissions by multiple wireless end devices. FIG. 7 depicts an interleaved arrangement of autonomous wireless transmission zones. The use of such an interleaved arrangement of autonomous wireless transmission zones may be implemented in order to accommodate various potentially conflicting requirements associated with allocation of wireless resources for autonomous wireless transmissions. For example, while the density of the autonomous wireless transmission zones needs to be proportional to the expected amount of autonomous traffic, it is also necessary to accommodate delays associated with payload decoding on the wireless access node and delivery/reception of corresponding payload acknowledgments to/by the wireless end devices by supporting sufficiently large intervals between consecutive (re)transmissions by the wireless end devices (e.g., which could be on the order of a few tens of milliseconds or even longer). Accordingly, the interleaved arrangement of autonomous wireless transmission zones may be configured in a manner for supporting (1) a sufficiently large density of autonomous wireless transmission zones to support the expected amount of autonomous traffic and (2) for each preamble index, sufficiently large intervals between adjacent autonomous payload transmission zones in the hopping sequence associated with the preamble index (e.g., every Kth autonomous wireless transmission zone supported by the wireless access node is used to provide a payload transmission zone for that preamble index, where K is set to be large enough to accommodate expected delays associated with payload decoding on the wireless access node and delivery/reception of corresponding payload acknowledgment). As depicted in FIG. 7, the interleaved arrangement of the autonomous wireless transmission zones is configured such that (1) there is no gap between adjacent autonomous wireless transmission zones while (2) the interval between consecutive autonomous payload transmission zones in the hopping sequence for a given preamble index is three autonomous wireless transmission zones (i.e., K=3). For example, if a wireless end device performed its initial autonomous payload transmission in autonomous wireless transmission zone (1,1), then it cannot perform its next autonomous payload transmission until autonomous wireless transmission zone (1,2), with autonomous wireless transmission zones (1,1) and (1,2) being separated by autonomous wireless transmission zones (2,1) and (3,1) to provide sufficient time for decoding of the payload by the wireless access node and delivery of a corresponding payload acknowledgment from the wireless access node to the wireless end device if the payload is successfully decoded by the wireless access node.

Various embodiments of the autonomous transmission capability may be configured to utilize narrowband (e.g., 2 PBRs) preamble transmissions spread across multiple TTIs (e.g. 3 TTIs) to achieve improvement in link budget, autonomous payload transmissions allowing wireless end devices to send short data bursts without the need for scheduling grants from the wireless access device (e.g., where each preamble maps to the sequence of designated payload resources (including the hopping pattern) that enables the wireless access node to identify all of the transmissions from the same wireless end device, where payload transmissions do not include any training sequences for timing recovery, and so forth), narrowband (e.g. 1 PRB) payload transmissions with bundling across multiple TTIs to improve link budget for extended coverage on each individual transmission attempt (e.g., provides up to 6 dB improvement in link budget with bundling up to 4 TTIs), pseudo-random (or deterministic) frequency hopping for fading and interferer diversity across multiple transmissions of the same payload (e.g., where the hopping pattern is tied to the preamble and the wireless end device is informed of the hopping patterns associated with different preambles through system information broadcast), acknowledgment monitoring (e.g., after each payload transmission, the wireless end device monitors the downlink in a known resource location for a positive acknowledgement and, in the absence of such an acknowledgement, starts the next transmission of the payload in the designated resource which is governed by the hopping pattern), energy accumulation through soft HARQ combining across multiple payload transmissions (e.g. provides 10 dB gain with 10 bundled transmissions separated in time and frequency) and detection of downlink acknowledgments between consecutive transmission attempts to enable early termination gains, partial overlaps between concurrent autonomous transmissions (based on pseudorandom hopping sequences) to gain efficiencies in resource allocation, overlay between autonomous and scheduled transmissions (e.g., enabled by interference cancellation of broadband transmissions from autonomous transmissions to gain further efficiency in resource allocation and avoid the need to allocate dedicated resources to autonomous transmissions), or the like, as well as various combinations thereof.

Various embodiments of the autonomous transmission capability may support an in-band autonomous transmission mode which can be used to efficiently transport small traffic bursts (e.g., IoT traffic) along with broadband traffic. The autonomous transmission capability provides a connectionless approach to uplink transmissions that addresses both desired scalability and extended coverage for low-power IoT devices. Namely, the desired scalability and extended coverage for a low-power IoT device may be provided, at least partially, using frequency-time hopping based on a hopping sequence known to the low-power IoT device and to the wireless access node via which the low-power IoT device performs its autonomous transmission. For example, with a known hopping sequence, the information bit energy of the low-power IoT device may then be accumulated over one or more hops, thereby providing the desired coverage in an energy efficient way due to diversity (e.g., frequency, time, interferer, and so forth). Similarly, for example, since each hop of the hopping sequence may span a narrow swath of contiguous frequencies, the low-power IoT device can operate with low transmit power, thereby enabling relatively simple and inexpensive IoT transceivers. It is noted that, while the hopping for autonomous transmission may be over dedicated slots, it may be more efficient to overlay these autonomous transmissions over conventional broadband uplink traffic (e.g., Physical Uplink Shared Channel (PUSCH) in LTE or other uplink traffic). It is further noted that this type of overlay may be achieved without significant interference to the conventional broadband uplink traffic, because IoT devices typically have relaxed delay requirements and the potential for energy accumulation. Accordingly the autonomous transmission mode may be configured to meet various goals (e.g., low-power, low-complexity device operation, extended coverage, low control overhead, energy efficiency, and higher spectral efficiency, or the like, as well as various combinations thereof.

Various embodiments of the autonomous transmission capability may be used to support various types of IoT applications which may span a wide range of requirements (e.g., in terms of latency, throughput, service availability, or the like, as well as various combinations thereof). Various embodiments of the autonomous transmission capability, while suitable for use in supporting various types of IoT applications which may span a wide range of requirements, may provide efficient mechanisms for delay tolerant IoT applications where short packet bursts need to be transmitted on the uplink by low-power, low-duty-cycle wireless devices, including for devices deployed in areas experiencing significant loss in Signal to Interference and Noise (SINR) ratio for reliable uplink communication. Various embodiments of the autonomous transmission capability may be used to support various other types applications which may span various other ranges of requirements.

Figure 8:
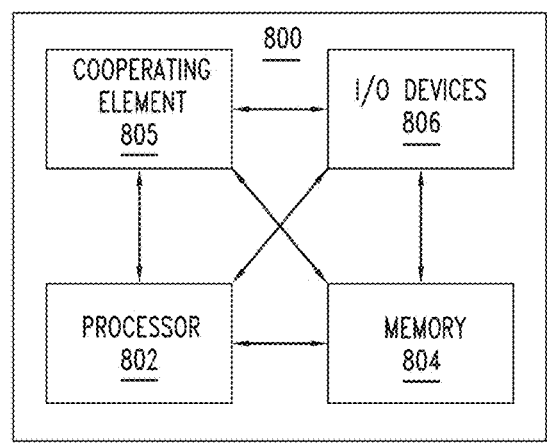
FIG. 8 depicts a high-level block diagram of a computer suitable for use in performing various functions described herein.

FIG. 8 depicts a high-level block diagram of a computer suitable for use in performing various functions described herein.

The computer 800 includes a processor 802 (e.g., a central processing unit (CPU), a processor having a set of processor cores, a processor core of a processor, or the like) and a memory 804 (e.g., a random access memory (RAM), a read only memory (ROM), or the like). The processor 802 and the memory 804 are communicatively connected.

The computer 800 also may include a cooperating element 805. The cooperating element 805 may be a hardware device. The cooperating element 805 may be a process that can be loaded into the memory 804 and executed by the processor 802 to implement functions as discussed herein (in which case, for example, the cooperating element 805 (including associated data structures) can be stored on a computer-readable storage medium, such as a storage device or other storage element (e.g., a magnetic drive, an optical drive, or the like)).

The computer 800 also may include one or more input/output devices 806. The input/output devices 806 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 800 of FIG. 8 may represent a general architecture and functionality suitable for implementing functional elements described herein, portions of functional elements described herein, or the like, as well as various combinations thereof. For example, computer 800 may provide a general architecture and functionality that is suitable for implementing one or more of wireless end device 110, a wireless access node 121, anchor node 122, controller 123, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that at least some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. A wireless device configured to communicate via a wireless uplink channel, the wireless device comprising:
a processor and a memory communicatively connected to the processor, the processor configured to:
receive, from a wireless access node, autonomous transmission description information comprising a mapping between a preamble and a hopping sequence of payload transmission zones identifying a first resource chunk in a first payload transmission zone of the wireless uplink channel and a second resource chunk in a second payload transmission zone of the wireless uplink channel;
transmit the preamble toward the wireless access node in a preamble transmission zone of the wireless uplink channel;
transmit a payload toward the wireless access node over the first resource chunk in the first payload transmission zone of the wireless uplink channel without establishing a connection with the wireless access node; and
based on a condition detected by the wireless device, retransmit the payload or a redundancy version of the payload over the second resource chunk in the second payload transmission zone of the wireless uplink channel without retransmitting the preamble.

2. The wireless device of claim 1, wherein the preamble transmission zone comprises a set of frequency-time resources of the wireless uplink channel.

3. The wireless device of claim 1, wherein the autonomous transmission description information includes a set of available preambles including the preamble, wherein the processor is configured to:
select the preamble from the set of available preambles indicated in the autonomous transmission description information.

4. The wireless device of claim 1, wherein the preamble is associated with a preamble index having associated therewith a preamble transmission subzone within the preamble transmission zone, wherein, to transmit the preamble in the preamble transmission zone of the wireless uplink channel, the processor is configured to:
transmit the preamble within the preamble transmission subzone within the preamble transmission zone.

5. The wireless device of claim 1, wherein the first payload transmission zone comprises a first set of frequency-time resources of the wireless uplink channel and the second payload transmission zone comprises a second set of frequency-time resources of the wireless uplink channel, wherein the first set of frequency-time resources and the second set of frequency-time resources differ in time.

6. The wireless device of claim 1, wherein the first resource chunk comprises a first set of frequency-time resources of the wireless uplink channel and the second resource chunk comprises a second set of frequency-time resources of the wireless uplink channel, wherein the first set of frequency-time resources and the second set of frequency-time resources differ in at least one of frequency or time.

7. The wireless device of claim 1, wherein the first payload transmission zone and the second payload transmission zone are separated by at least one intermediate payload transmission zone.

8. The wireless device of claim 1, wherein at least one of the first resource chunk comprises one or more frequency-time resources using bundling across a set of multiple time intervals or the second resource chunk comprises one or more frequency-time resources using bundling across a set of multiple time intervals.

9. The wireless device of claim 1, wherein the processor is configured to:
transmit the payload toward the wireless access node over the first resource chunk in the first payload transmission zone of the wireless uplink channel without waiting for a preamble acknowledgment from the wireless access node.

10. The wireless device of claim 1, wherein the condition comprises at least one of:
a determination that a payload acknowledgment associated with transmission of the payload over the first resource chunk is not received in a payload acknowledgment zone; or
a determination that the payload is unlikely to be successfully received by the wireless access node using a single transmission of the payload.

11. A method for use by a wireless device to communicate via a wireless uplink channel, the method comprising:
receiving, from a wireless access node, autonomous transmission description information comprising a mapping between a preamble and a hopping sequence of payload transmission zones identifying a first resource chunk in a first payload transmission zone of the wireless uplink channel and a second resource chunk in a second payload transmission zone of the wireless uplink channel;
transmitting the preamble toward the wireless access node in a preamble transmission zone of the wireless uplink channel;
transmitting a payload toward the wireless access node over the first resource chunk in the first payload transmission zone of the wireless uplink channel without establishing a connection with the wireless access node; and
based on a condition detected by the wireless device, retransmitting the payload or a redundancy version of the payload over the second resource chunk in the second payload transmission zone of the wireless uplink channel without retransmitting the preamble.

12. A wireless access node configured to support communication by a wireless device via a wireless uplink channel, comprising:
a processor and a memory communicatively connected to the processor, the processor configured to:
send autonomous transmission description information comprising a mapping between a preamble and a hopping sequence of payload transmission zones identifying a first resource chunk in a first payload transmission zone of the wireless uplink channel and a second resource chunk in a second payload transmission zone of the wireless uplink channel;
detect the preamble in a preamble transmission zone of the wireless uplink channel;
receive a first signal over the first resource chunk of the first payload transmission zone of the wireless uplink channel without establishing a connection with the wireless device; and
based on a condition detected by the wireless access node, receive a second signal over the second resource chunk of the second payload transmission zone of the wireless uplink channel without detecting a retransmission of the preamble.

13. The wireless access node of claim 12, wherein the preamble transmission zone comprises a set of frequency-time resources of the wireless uplink channel.

14. The wireless access node of claim 12, wherein the preamble is associated with a preamble index having associated therewith a preamble transmission subzone within the preamble transmission zone, wherein, to detect the preamble in the preamble transmission zone of the wireless uplink channel, the processor is configured to:
monitor the preamble transmission subzone of the preamble transmission zone.

15. The wireless access node of claim 14, wherein the preamble transmission subzone comprises a set of frequency-time resources of the preamble transmission zone.

16. The wireless access node of claim 12, wherein the processor is configured to:
identify, from a set of preamble indexes supported by the wireless access node and based on the preamble and a preamble transmission subzone of the preamble transmission zone, a preamble index associated with detection of the preamble in the preamble transmission subzone within the preamble transmission zone; and
identify, based on the preamble index associated with detection of the preamble, the hopping sequence of payload transmission zones.

17. The wireless access node of claim 12, wherein the first payload transmission zone comprises a first set of frequency-time resources of the wireless uplink channel and the second payload transmission zone comprises a second set of frequency-time resources of the wireless uplink channel, wherein the first set of frequency-time resources and the second set of frequency-time resources differ in time.

18. The wireless access node of claim 12, wherein the first resource chunk comprises a first set of frequency-time resources of the wireless uplink channel and the second resource chunk comprises a second set of frequency-time resources of the wireless uplink channel, wherein the first set of frequency-time resources and the second set of frequency-time resources differ in at least one of frequency or time.

19. The wireless access node of claim 12, wherein at least one of the first resource chunk comprises one or more frequency-time resources using bundling across a set of multiple time intervals or the second resource chunk comprises one or more frequency-time resources using bundling across a set of multiple time intervals.

20. The wireless access node of claim 12, wherein the processor is configured to:
based on the condition detected by the wireless access node, store soft information associated with decoding of the first signal received over the first resource chunk of the first payload transmission zone.

21. The wireless access node of claim 20, wherein the processor is configured to:
initiate decoding of the second signal received over the second resource chunk in the second payload transmission zone of the wireless uplink channel based on the soft information associated with decoding of the first signal received over the first resource chunk of the first payload transmission zone.

22. The wireless access node of claim 12, wherein the processor is configured to:

determine whether broadband interference from a cancellable source is present in the first signal received over the first resource chunk of the first payload transmission zone; and store, based on whether broadband interference from a cancellable source is present in the first signal received over the first resource chunk of the first payload transmission zone, soft information associated with decoding of the first signal received over the first resource chunk of the first payload transmission zone.

23. The wireless access node of claim 12, wherein the processor is configured to:

receive the first signal over the first resource chunk of the first payload transmission zone of the wireless uplink channel without transmitting a preamble acknowledgment toward the wireless device.

24. The wireless access node of claim 12, wherein the condition comprises at least one of:

a determination that decoding of the first signal in the first resource chunk of the first payload transmission zone to recover a payload is unsuccessful; or a determination that at least one additional signal is expected to be received from the wireless device.

25. The wireless access node of claim 12, wherein the processor is configured to:

initiate decoding of the second signal received over the second resource chunk in the second payload transmission zone of the wireless uplink channel to recover a payload; and based on a determination that decoding of the second signal to recover the payload is successful, propagate a payload acknowledgment in a payload acknowledgment zone.

26. A method for use by a wireless access node to support communication by a wireless device via a wireless uplink channel, the method comprising:

sending autonomous transmission description information comprising a mapping between a preamble and a hopping sequence of payload transmission zones identifying a first resource chunk in a first payload transmission zone of the wireless uplink channel and a second resource chunk in a second payload transmission zone of the wireless uplink channel;

detecting the preamble in a preamble transmission zone of the wireless uplink channel;

receiving a first signal over the first resource chunk of the first payload transmission zone of the wireless uplink channel without establishing a connection with the wireless device; and based on a condition detected by the wireless access node, receiving a second signal over the second resource chunk of the second payload transmission zone of the wireless uplink channel without detecting a retransmission of the preamble.

27. A wireless access node configured to support communication by a wireless device via a wireless uplink channel, comprising:

a processor and a memory communicatively connected to the processor, the processor configured to:

detect a preamble in a preamble transmission zone of the wireless uplink channel;

receive a first signal over a first resource chunk of a first payload transmission zone of the wireless uplink channel without establishing a connection with the wireless device;

determine whether broadband interference from a cancellable source is present in the first signal received over the first resource chunk of the first payload transmission zone; and based on a condition detected by the wireless access node, receive a second signal over a second resource chunk of a second payload transmission zone of the wireless uplink channel without detecting a retransmission of the preamble.

28. The wireless access node of claim 27, wherein the processor is configured to:

based on a determination that broadband interference from a cancellable source is not present in the first signal received over the first resource chunk of the first payload transmission zone:

store soft information associated with decoding of the first signal received over the first resource chunk of the first payload transmission zone.

29. The wireless access node of claim 27, wherein the processor is configured to:

based on a determination that broadband interference from a cancellable source is present in the first signal received over the first resource chunk of the first payload transmission zone:

decode the broadband interference from the cancellable source;

cancel the broadband interference from the cancellable source to provide thereby a modified first signal; and attempt to decode the modified first signal to recover the payload.

* * * * *